(12) United States Patent
Hearst et al.

(10) Patent No.: US 11,334,986 B2
(45) Date of Patent: May 17, 2022

(54) SYSTEM AND METHOD FOR PROCESSING IMAGES OF AGRICULTURAL FIELDS FOR REMOTE PHENOTYPE MEASUREMENT

(71) Applicant: Purdue Research Foundation, West Lafayette, IN (US)

(72) Inventors: Anthony A. Hearst, Lafayette, IN (US); Keith A. Cherkauer, West Lafayette, IN (US); Katherine M. Rainey, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 25 days.

(21) Appl. No.: 16/776,767

(22) Filed: Jan. 30, 2020

(65) Prior Publication Data
US 2020/0242749 A1 Jul. 30, 2020

Related U.S. Application Data

(60) Provisional application No. 62/798,986, filed on Jan. 30, 2019.

(51) Int. Cl.
*G06T 7/00* (2017.01)
(52) U.S. Cl.
CPC .... *G06T 7/001* (2013.01); *G06T 2207/30188* (2013.01)
(58) Field of Classification Search
CPC .......... G06T 7/001; G06T 2207/30188; G06K 9/4671; G06K 9/6211; G06K 9/00657
USPC ........................................................ 382/110
See application file for complete search history.

(56) References Cited

U.S. PATENT DOCUMENTS

2018/0121726 A1* 5/2018 Redden .............. G06K 9/00657
2018/0232579 A1 8/2018 Rainey et al.
2019/0026554 A1 1/2019 Rainey et al.
(Continued)

OTHER PUBLICATIONS

Araus, J.L. et al., Field high-throughput phenotyping: the new crop breeding frontier, Trends in Plant Science, 2014.
(Continued)

*Primary Examiner* — Ayodeji O Ayotunde
(74) *Attorney, Agent, or Firm* — Maginot, Moore & Beck LLP

(57) ABSTRACT

A method for processing images of an agricultural field is disclosed that enables accurate phenotype measurements for crops planted in each research plot of the agricultural field. The method comprises receiving a plurality of input images of the agricultural field, calculating and refining object space coordinates for matched key points in the input images and an object space camera pose for each input image, calculating and refining object space center points for the research plots based on a user-defined plot layout, and generating output images of individual research plots that are centered, cropped, orthorectified, and oriented in alignment with planted rows of crops. Based on the output images, accurate phenotype measurements for crops planted in each research plot can be determined. The method advantageously minimizes row-offset errors, variations in canopy cover and color between images, geometric and radiometric distortion, and computational memory requirements, while facilitating parallelized image processing and analysis.

18 Claims, 17 Drawing Sheets

(56) References Cited

U.S. PATENT DOCUMENTS

2020/0193589 A1* 6/2020 Peshlov ............ G06K 9/00986

OTHER PUBLICATIONS

Haghighattalab, A. et al., Application of unmanned aerial systems for high throughput phenotyping of large wheat breeding nurseries, Plant Methods, 2016.

Shi, Y. et al. Unmanned aerial vehicles for high-throughput phenotyping and agronomic research, PLoS ONE, 2016.

Mikhail, Em., An introduction to photogrammetry, Coherent Optics in Mapping, 1974.

Otsu, N., A threshold selection method from gray-level histograms. Systems, Man and Cybernetics, 1979.

Woebbecke, DM, et al., Color indices for weed identification under various soil, residue, and lighting conditions. Transactions of the ASAE, 1995, pp. 259-269.

Hearst, AA, Cherkauer KA., Extraction of small spatial plots from geo-registered UAS imagery of crop fields, Environmental Practice, 2015.

Steduto, P, Hsiao T, Raes D, et al., AquaCrop—the FAO crop model to simulate yield response to water: I. concepts and underlying principles, Agronomy Journal, 2009.

Normanly, J., High-throughput phenotyping in plants: methods and protocols. New York: Humana Press; 2012.

Xavier, A. et al., Genetic architecture of phenomic-enabled canopy cover in Glycine max. Genetics. 2016.

Hall, BP., Quantitative characterization of canopy coverage in the genetically diverse soynam population. ProQuest Dissertations & Theses Global, 2015, https://search.proquest.com/docview/1776609221?accountid=13360.

Hatfield, JL, Prueger JH., Value of using different vegetative indices to quantify agricultural crop characteristics at different growth stages under varying management practices, Remote Sensing, 2010.

Viña A., Monitoring maize (*Zea mays* L.) phenology with remote sensing. Agronomy, 2004, pp. 1139-1148.

Torres-Sánchez J, Peña JM, de Castro Al, et al. Multi-temporal mapping of the vegetation fraction in early-season wheat fields using images from UAV. Computers and Electronics in Agriculture. 2014.

FAO's director-general on how to feed the world in 2050, Population and Development Review, 2009, pp. 837-839, 35 (4).

Cabrera-Bosquet, L. et al., High-throughput phenotyping and genomic selection: the frontiers of crop breeding converge, Journal of Integrative Plant Biology, 2012, pp. 312-320, 54(5).

Majer, P., Leaf hue measurements offer a fast, high-throughput initial screening of photosynthesis in leaves. Journal Of Plant Physiology, 2010, 167(1), 74.

Adamsen, F. J. et al., Measuring wheat senescence with a digital camera. Crop science, 1999, pp. 719-724, 39(3).

Marchant, J. A., Dealing with color changes caused by natural illumination in outdoor machine vision. Cybernetics & Systems, 2004, pp. 19-34, 35(1).

Campbell, J. B., & Wynne, R. H., Introduction to Remote Sensing (5 ed.). New York: The Guilford Press, 2011.

Watson, P. F., & Petrie, A., Method agreement analysis: a review of correct methodology. Theriogenology Journal, 2010, pp. 1167-1179, 73(9).

Xue, J., & Su, B., Significant remote sensing vegetation indices: a review of developments and applications. Journal of Sensors, 2017, pp. 1-17.

Eysn, L., Hollaus, M., Pfeifer, N., & Schadauer, K., Forest delineation based on airborne LIDAR data. Remote Sensing, 2012, pp. 762-783, 4(12).

Steduto, P. et al., Concepts and applications of AquaCrop: the FAO crop water productivity model, 2009, pp. 175-191: Beijing: Berlin; New York: Tsinghua University Press; Springer.

Hearst, A. et al., Optimizing Uas Image Acquisition and Geo-Registration for Precision Agriculture. Proceedings American Geophysical Union (AGU) Fall Meeting, San Francisco, CA, Dec. 19, 2014.

Xavier, A. et al., Genetic Architecture of Phenomic-Enabled Canopy Coverage in Glycine max, Genetics, vol. 206, 1081-1089 Jun. 2017.

Xavier, A. et al., Using unsupervised learning techniques to assess interactions among complex traits in soybeans, Euphytica (2017).

Lopez, M. et al., Phenotypic variation and genetic architecture for photosynthesis and water use efficiency in Soybean, Frontiers in Plant Science (2019).

Moreira, F. et al., Improving the efficiency of soybean breeding with high-throughput canopy phenotyping, Plant Methods (2019).

Herrero-Huerta, M. et al., High Throughput Phenotyping of Physiological Growth Dynamics from UAS-Based 3D Modeling in Soybean, The International Archives of the Photogrammetry, Remote Sensing and Spatial Information Sciences, vol. XLII-2/W13, 2019.

Herrero-Huerta, M. et al., Triple S: A new tool for Soybean High Throughput Phenotyping from UAS-based Multispectral Imagery, Proc. SPIE 11007, Advanced Environmental, Chemical, and Biological Sensing Technologies XV, 110070K (2019).

\* cited by examiner

SYSTEM AND METHOD FOR PROCESSING IMAGES OF AGRICULTURAL FIELDS FOR REMOTE PHENOTYPE MEASUREMENT

This application claims the benefit of priority of U.S. provisional application Ser. No. 62/798,986, filed on Jan. 30, 2019 the disclosure of which is herein incorporated by reference in its entirety.

GOVERNMENT LICENSE RIGHTS

This invention was made with government support under contract number DGE-1333468 awarded by the National Science Foundation. The government has certain rights in the invention.

FIELD

The device and method disclosed in this document relates to image processing and, more particularly, to processing images of agricultural fields for remote phenotype measurement.

BACKGROUND

Unless otherwise indicated herein, the materials described in this section are not prior art to the claims in this application and are not admitted to the prior art by inclusion in this section.

Due to global population rise, yields of major food crops must be increased to ensure future food security. At the same time, limitations in water resources and climate change will make it increasingly difficult to manage agricultural resources and obtain higher yields. Therefore, it is necessary to improve our understanding of how droughts and floods impact crop growth and yield. Research in agronomy, crop modeling, and breeding have advanced our understanding of crop growth dynamics and water relations to yield by assimilating current knowledge and relying on meteorological and agronomic data to test our understanding. This has led to more accurate yield predictions, more effective breeding, better agricultural resource management, and higher yields.

Breeders have begun studies on field-based High-Throughput Phenotyping (HTP). This involves planting many varieties of a crop in thousands of small agronomic research plots and precisely measuring standard physical traits, or 'phenotypes', for every plot. These phenotypes serve as indicators of crop performance. This allows many varieties to be quickly screened for desired characteristics, enabling rapid progress towards varieties that are high-yielding and tolerant to moisture stress. The main challenges of field-based HTP are that phenotypes must be measured precisely enough to distinguish the often-subtle differences between research plots, and, when fields are large enough, additional field observations may be needed to prevent within-field variation from confounding observed differences between research plots. The need for high measurement precision and the high cost of manual labor traditionally required to collect these data are significant obstacles that must be addressed for these types of studies to progress.

SUMMARY

A method is disclosed for processing images of an agricultural field, the agricultural field having a plurality of plots. The method comprises receiving, with at least one processor, a plurality of input images that capture respective portions of the agricultural field in an overlapping manner, each input image in the plurality of images being captured by a camera positioned above the agricultural field and having metadata including a respective position of the camera at a time the respective input image was captured. The method comprises calculating, with the at least one processor, (i) object space positions in an object space of a plurality of key points in the plurality of images and (ii) an object space camera pose in the object space for each input image in the plurality of input images, the object space representing a real-world space of the agricultural field. The method comprises calculating, with the at least one processor, an object space center point in the object space for each plot in the plurality of plots based on a layout of the plurality of plots in the agricultural field. The method comprises generating, with the at least one processor, a plurality of output images, each output image in the plurality of output images being orthorectified and cropped with respect to a respective plot in plurality of plots based on an input image in the plurality of input images that includes the respective plot.

A processing system is disclosed for processing images of an agricultural field, the agricultural field having a plurality of plots. The processing system comprises at least one memory configured to store program instructions and to store a plurality of input images that capture respective portions of the agricultural field in an overlapping manner, each input image in the plurality of images being captured by a camera positioned above the agricultural field and having metadata including a respective position of the camera at a time the respective input image was captured. The processing system comprises at least one processor. The at least one processor configured to execute the program instructions stored on the memory to calculate (i) object space positions in an object space of a plurality of key points in the plurality of images and (ii) an object space camera pose in the object space for each input image in the plurality of input images, the object space representing a real-world space of the agricultural field. The at least one processor configured to execute the program instructions stored on the memory to calculate an object space center point in the object space for each plot in the plurality of plots based on a layout of the plurality of plots in the agricultural field. The at least one processor configured to execute the program instructions stored on the memory to generate a plurality of output images, each output image in the plurality of output images being orthorectified and cropped with respect to a respective plot in plurality of plots based on an input image in the plurality of input images that includes the respective plot.

A non-transitory computer-readable medium is disclosed for processing images of an agricultural field, the agricultural field having a plurality of plots. The computer-readable medium stores program instructions that, when executed by at least one processor, cause the at least one processor to receive a plurality of input images that capture respective portions of the agricultural field in an overlapping manner, each input image in the plurality of images being captured by a camera positioned above the agricultural field and having metadata including a respective position of the camera at a time the respective input image was captured. The computer-readable medium stores program instructions that, when executed by at least one processor, cause the at least one processor to calculate (i) object space positions in an object space of a plurality of key points in the plurality of images and (ii) an object space camera pose in the object space for each input image in the plurality of input images, the object space representing a real-world space of the agricultural field. The computer-readable medium stores program instructions that, when executed by at least one processor, cause the at least one processor to calculate an object space center point in the object space for each plot in the plurality of plots based on a layout of the plurality of plots in the agricultural field. The computer-readable medium stores program instructions that, when executed by at least one processor, cause the at least one processor to generate a plurality of output images, each output image in the plurality of output images being orthorectified and cropped with respect to a respective plot in plurality of plots based on an input image in the plurality of input images that includes the respective plot.

BRIEF DESCRIPTION OF THE DRAWINGS

The foregoing aspects and other features of the method and system are explained in the following description, taken in connection with the accompanying drawings.

DETAILED DESCRIPTION

Figure 1:
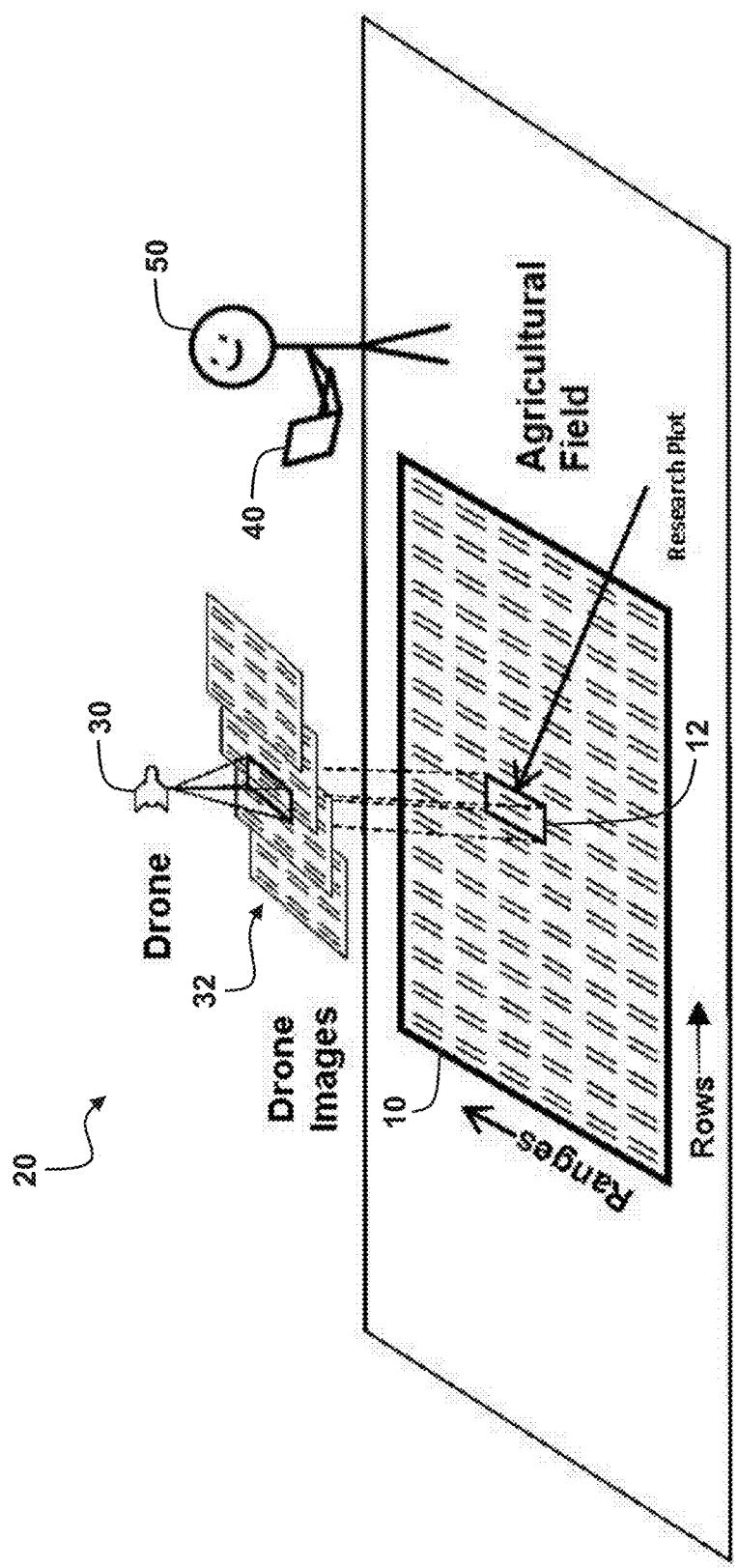
FIG. 1 shows a phenotype measurement system for remotely measuring phenotypes of agricultural crops planted in an agricultural field.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Phenotype Measurement System

FIG. 1 shows a phenotype measurement system 20 for remotely measuring phenotypes of agricultural crops or other vegetation planted in an agricultural field 10. The system 20 comprises an unmanned aircraft system (UAS) 30, which is referred to herein simply as a "drone." The drone 30 is configured to capture a plurality of images 32 of the agricultural field 10. The plurality of images 32 are provided to a processing system 40, such as a laptop computer, which is operated by a researcher 60. The processing system 40 is configured to process the images 32 to enable fast, accurate, and cost-effective measurement of observable characteristics and traits of crops or other vegetation planted in the agricultural field 10, which are referred to herein simply as "phenotypes" of the crops or other vegetation.

The phenotype measurement system 20 is particularly advantageous for usage in field-based High-Throughput Phenotyping (HTP) in which many varieties of a crop are planted in a large number of small agronomic research plots. To this end, in the illustrated embodiment, the agricultural field 10 comprises a plurality of rectangular research plots 12 arranged in a grid formation having a plurality of rows and a plurality of ranges. Each research plot 12 may comprise a different variety of crop or be subjected to different agricultural treatments or practices. The drone 30 comprises a digital camera or equivalent image sensors configured to capture the images 32 at the field scale with the spatial resolution required to resolve individual plots, such that differences in the phenotypes of crops or other vegetation planted in each individual research plot 12 can be determined. Particularly, based on the images 32, the processing system 40 is configured to determine phenotypes for the crops or other vegetation planted in each individual research plot 12 including, for example, canopy cover, greenness, stand count, or row length.

Measurement of such phenotypes on a plot-by-plot basis advantageously enables the researcher 60 to perform more accurate simulations of moisture stress in the crops or other vegetation, as well as other relevant simulations, and to make more informed selections of high-yielding crop varieties that are resistant to moisture stress, or other factors. In addition, the phenotype measurement system 20 enables the researcher to perform these measurements quickly and at very low cost, thereby providing critical technological improvement compared to conventional manual labor intensive phenotype measurement techniques, particularly in a world where water resources are increasingly scarce and food security is at risk.

Figure 2:
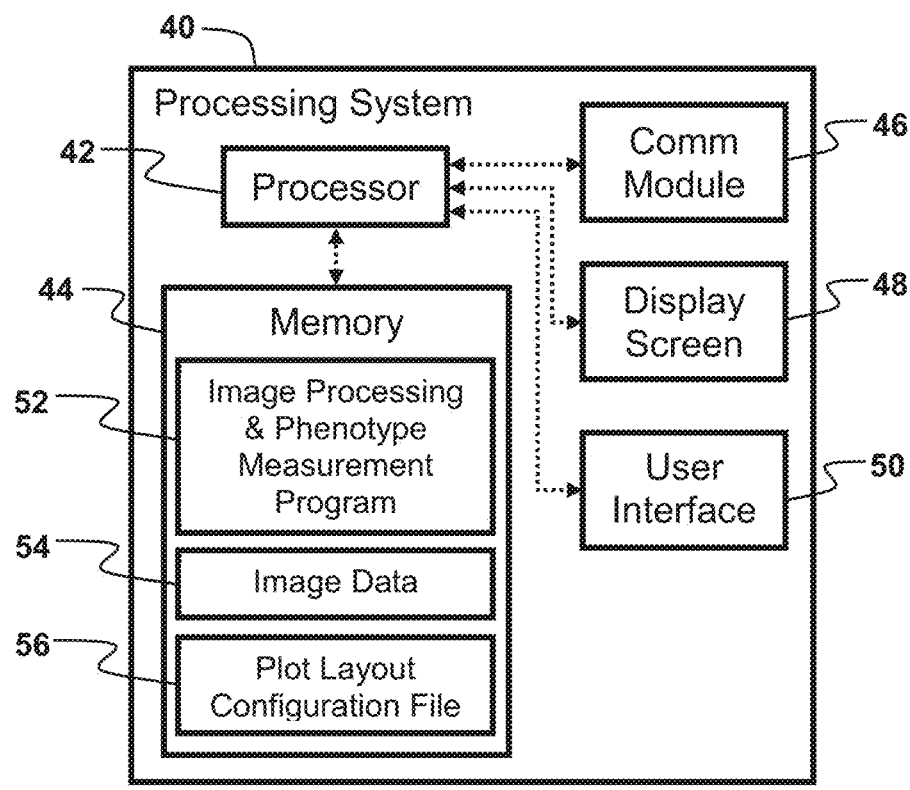
FIG. 2 shows exemplary components of the processing system of the system of FIG. 1.

FIG. 2 shows exemplary components of the processing system 40 of the phenotype measurement system 20. It will be appreciated that the components of the processing system 40 shown and described are merely exemplary and that the processing system 40 may comprise any alternative configuration. Particularly, the processing system 40 may comprise any computing device such as a desktop computer, a laptop, a smart phone, a tablet, a personal digital assistant (PDA), a smart watch, or other personal electronic device. Thus, the processing system 40 may comprise any hardware components conventionally included in such computing devices.

In the illustrated exemplary embodiment, the processing system 40 comprises at least one processor 42, at least one memory 44, a communication module 46, a display screen 48, and a user interface 50. The memory 44 is configured to store data and program instructions that, when executed by the at least one processor 42, enable the processing system 40 to perform various operations described herein. The memory 44 may be of any type of device capable of storing information accessible by the at least one processor 42, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the at least one processor 42 may include a central processing unit, graphics processing units, multiple processing units, dedicated circuitry for achieving functionality, programmable logic, or other processing systems. Additionally, it will be appreciated that, although the processing system 40 is illustrated as single device, the processing system 40 may comprise several distinct processing systems 40 that work in concert to achieve the functionality described herein.

The communication module 46 may comprise one or more transceivers, modems, processors, memories, oscillators, antennas, or other hardware conventionally included in a communications module to enable communications with various other devices, such as the drone 30. In at least some embodiments, the communication module 46 includes a Wi-Fi module configured to enable communication with a Wi-Fi network and/or Wi-Fi router (not shown). In further embodiments, the communications modules 46 may further include a Bluetooth® module, an Ethernet adapter and communications devices configured to communicate with wireless telephony networks.

The display screen 48 may comprise any of various known types of displays, such as LCD or OLED screens. In some embodiments, the display screens 48 may comprise a touch screen configured to receive touch inputs from a user. The user interface 50 may suitably include a variety of devices configured to enable local operation of the processing system 40 by the researcher 60, such as a mouse, trackpad, or other pointing device, a keyboard or other keypad, speakers, and a microphone, as will be recognized by those of ordinary skill in the art. Alternatively, in some embodiments, a user may operate the processing system 40 remotely from another computing device which is in communication therewith via the communication module 46 and has an analogous user interface.

The program instructions stored on the memory 44 include an image processing & phenotype measurement program 52. The data stored on the memory 44 includes image data 54, at least including raw images 32 captured by the drone 30, and a plot layout configuration file 56 defining a layout of the research plots 12. As discussed in further detail below, the processor 42 is configured to execute the image processing & phenotype measurement program 50 to process the raw images 32, with reference to the plot layout configuration file 56, to produce a plurality of output images of individual research plots 12, which have been accurately cropped, centered, and orthorectified, while minimizing geometric and radiometric distortion or row-offset errors. Additionally, the processor 42 is configured to execute the image processing & phenotype measurement program 50 to determine one or more phenotypes for crops or other vegetation planted in each individual research plot 12 based on the output images of individual research plots 12. The determined phenotypes may include, for example, canopy cover, greenness, stand count, and row length.

Figure 3:
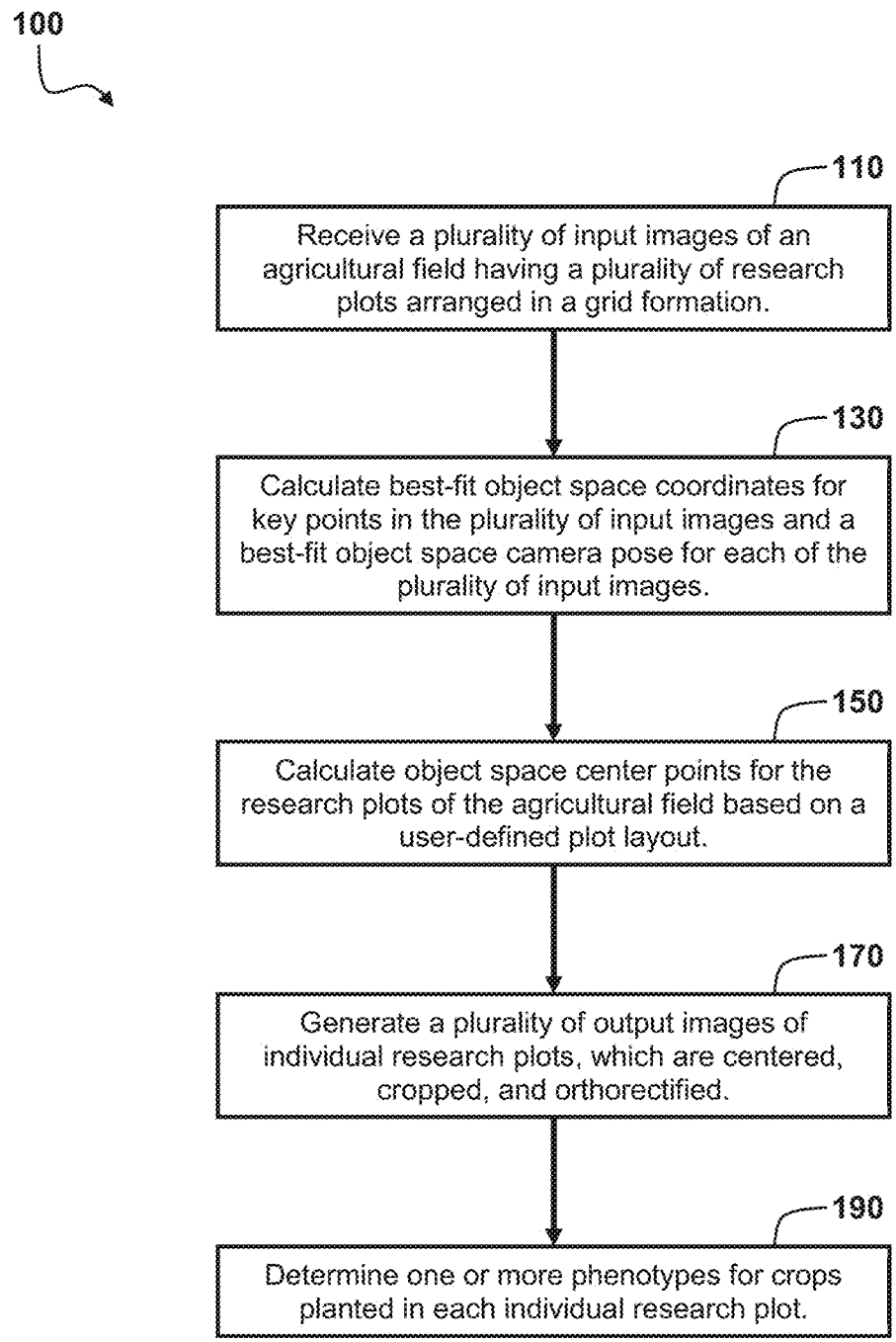
FIG. 3 shows a method for processing images of an agricultural field for remote phenotype measurement.

Method of Processing Images of Agricultural Fields for Remote Phenotype Measurement FIG. 3 shows a method 100 for processing images of an agricultural field for remote phenotype measurement. In the description of the method, statements that a method, process, processor, and/or system is performing some task or function refers to a processor (e.g., the processor 42 of the processing system 40) executing programmed instructions stored in non-transitory computer readable storage media (e.g., the memory 44 of the processing system 40) operatively connected to the processor to manipulate data or to operate one or more components of the processing system 40 or the phenotype measurement system 20 to perform the task or function. Additionally, the steps of the methods may be performed in any feasible chronological order, regardless of the order shown in the figures or the order in which the steps are described.

The method 100 begins with a step of receiving a plurality of input images of an agricultural field having a plurality of research plots arranged in a grid formation (block 110). Particularly, the processor 42 is configured to read from the memory 44 or otherwise receive a plurality of raw input images (e.g., the plurality of input images 32) of the agricultural field 10. In one embodiment, the plurality of raw input images are previously received from the drone 30 via wired or wireless network connection, in which case the processor 42 operates the communications module 46 to receive the plurality of raw input images from the drone 30 and writes the plurality of raw input images to the memory 44 (i.e., in the image data 54). Alternatively, the plurality of raw input images are previously received and written to the memory 44 via some other mechanism, such as by a removable storage medium of the drone 30 (e.g., a memory card or the like).

In many embodiments, each raw input image in the plurality of raw input images is a two-dimensional 3-band red-green-blue (RGB) image. However, in some embodiments, the raw input images may further include infrared information or similar bands including spatial, distance, or other geometric information. Each raw input image includes metadata, which at least includes spatial coordinates indicating the position from which the respective raw input image was captured. In at least one embodiment, the spatial coordinates comprise global positioning system (GPS) coordinates which at least include a latitude value and a longitude value. Preferably, the GPS coordinates also include an altitude value, but in some instances, an altitude can be assumed or otherwise provided. The GPS coordinates are captured by a GPS sensor of the drone 30. Notably, using the method 100, the GPS coordinates needn't be perfectly accurate and may, for example, have horizontal and vertical accuracy of approximately 2 meters and 5 meters, respectively. In some embodiments, the metadata of each raw input image includes additional information regarding the camera and camera settings that were used to capture the raw input images, such as sensor width and height, camera maker, camera model, F-stop, exposure time, ISO speed, exposure bias, focal length, max aperture, metering mode, subject distance, flash mode, flash energy, and 35 mm focal length.

The plurality of raw input images are captured with a nadir-view camera orientation, that is, with the camera pointed toward the ground from the sky above. However, it will be appreciated that, using the method 100, the input images needn't be captured with a perfectly nadir-view. Additionally, the raw input images are generally captured with a significant amount of overlap (e.g., 70-90%) between neighboring images in the plurality of raw input images. In this way, each individual plot 12 of the agricultural field 10 is captured in several different raw input images (e.g., at least four raw input images).

Figure 4:
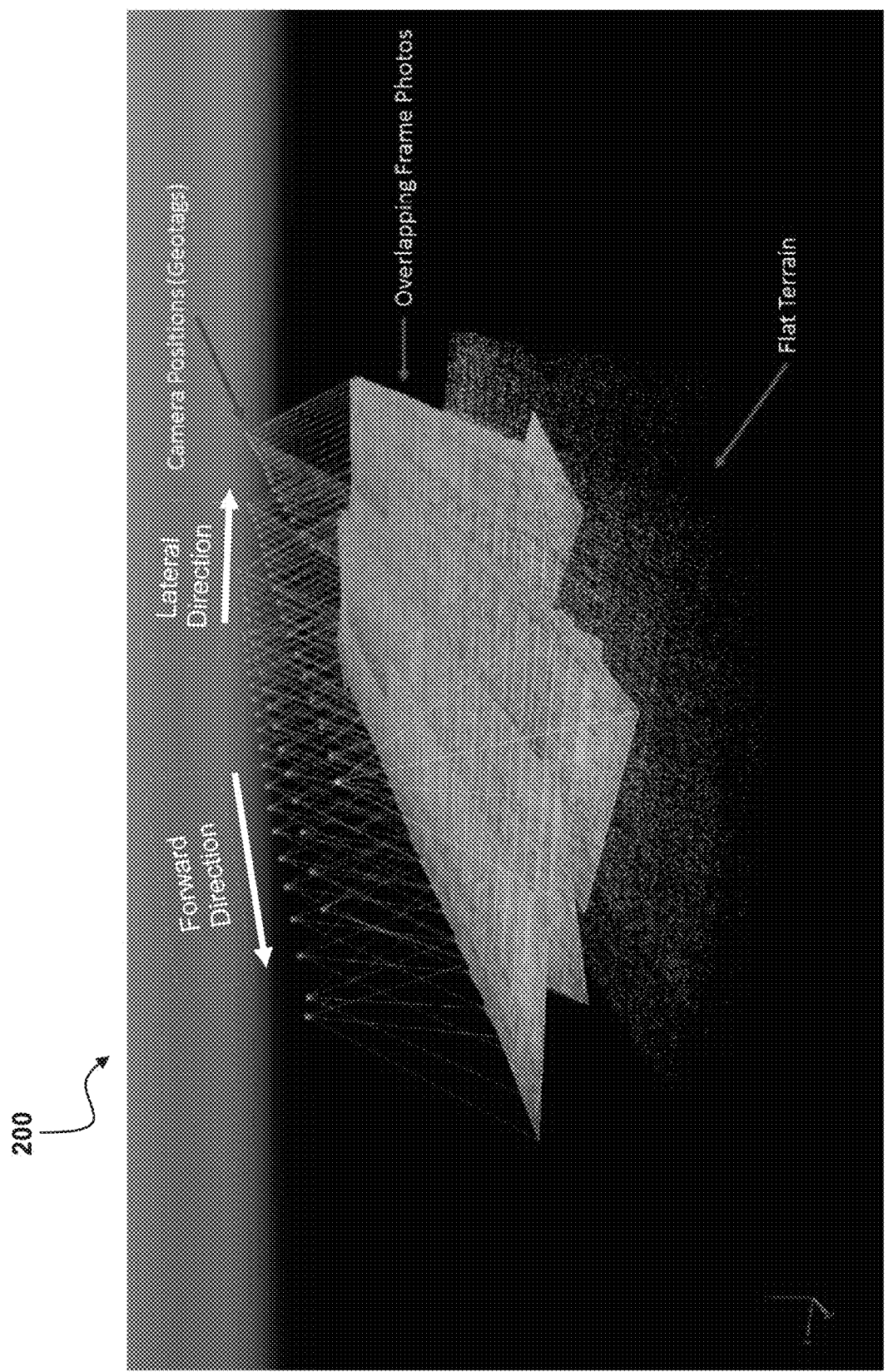
FIG. 4 shows an exemplary capture pattern for a plurality of input images of an agricultural field by a drone.

FIG. 4 shows an exemplary capture pattern for the plurality of raw input images of the agricultural field 10 by a drone 30. Particularly, in at least one embodiment, the raw input images are captured by the drone 30 over the course of a several forward flight passes that are laterally spaced so as to provide a significant amount of lateral overlap (e.g., 70-90%) between raw input images captured in sequential forward flight passes. Additionally, during each forward flight pass, the raw input images are captured with frequency such that there is also a significant amount of forward overlap (e.g., 70-90%) between sequentially captured raw input images in the same forward flight pass.

Returning to FIG. 3, the method 100 continues with a step of calculating best-fit object space coordinates for key points in the plurality of input images and a best-fit object space camera pose for each of the plurality of input images (block 130). Particularly, the processor 42 is configured to calculate object space coordinates for key points in the plurality of raw input images and an object space camera pose for each individual raw input image. As used herein, the phrase "object space" refers to a three-dimensional coordinate system representing the real-world space of agricultural field 10. As used herein, the phrase "camera pose" refers to a position and orientation of a camera at the time of capturing an image. In at least some embodiments, the object space is a Cartesian coordinate system. Thus, in at least some embodiments, the processor 42 calculates the object space coordinates for the key points in the form of coordinate positions $(x_{keypoint}, y_{keypoint}, z_{keypoint})$. Likewise, in at least some embodiments, the processor 42 calculates the camera pose for each input image in the form of a camera coordinate position $(x_{camera}, y_{camera}, z_{camera})$ and a camera orientation $(\theta_{x_{camera}}, \theta_{y_{camera}}, \theta_{z_{camera}})$. It will be appreciated, however, that equivalent alternative forms may be used for the object space coordinates for the key points or for the camera pose for each raw input image.

As an initial step, in some embodiments, the processor 42 is configured to convert GPS coordinates in the metadata of each raw input image into respective object space coordinates. In at least one embodiment, the processor 42 is configured to convert the GPS coordinates using parallelized computations. It will be appreciated that GPS coordinates are polar coordinates, rather than Cartesian coordinates. As mentioned above, in at least some embodiments, the object space is a Cartesian coordinate system. In some embodiments, the processor 42 converts the latitude and longitude GPS coordinates for each input image into easting and northing coordinates using the Universal Transverse Mercator (UTM) Cartesian coordinate system. However, in principle, any absolute or relative coordinate system can be used in the object space. This converted set of object space coordinates for the raw input images serve as initial values $(x_{camera}, y_{camera}, z_{camera})^{initial}$ for the object space camera positions from which the raw input images were captured.

Next, the processor 42 is configured to detect one or more image space key points in each input image. Each detected key point is defined by an image space coordinate, for example in the form of $(a_{keypoint}, b_{keypoint})$, which indicates a position of the key point within the respective input image. Additionally, each detected key point is also defined by a descriptor indicating features of the key point within the respective input image, for example in the form of intensity or other pixel values at and around the image space coordinate of the key point. The processor 42 determines the key points using a suitable key point detection and description algorithm, such as the Speeded-Up Robust Features (SURF) algorithm. In at least one embodiment, the processor 42 is configured to determine the key points in each input image using parallelized computations.

Figure 5:
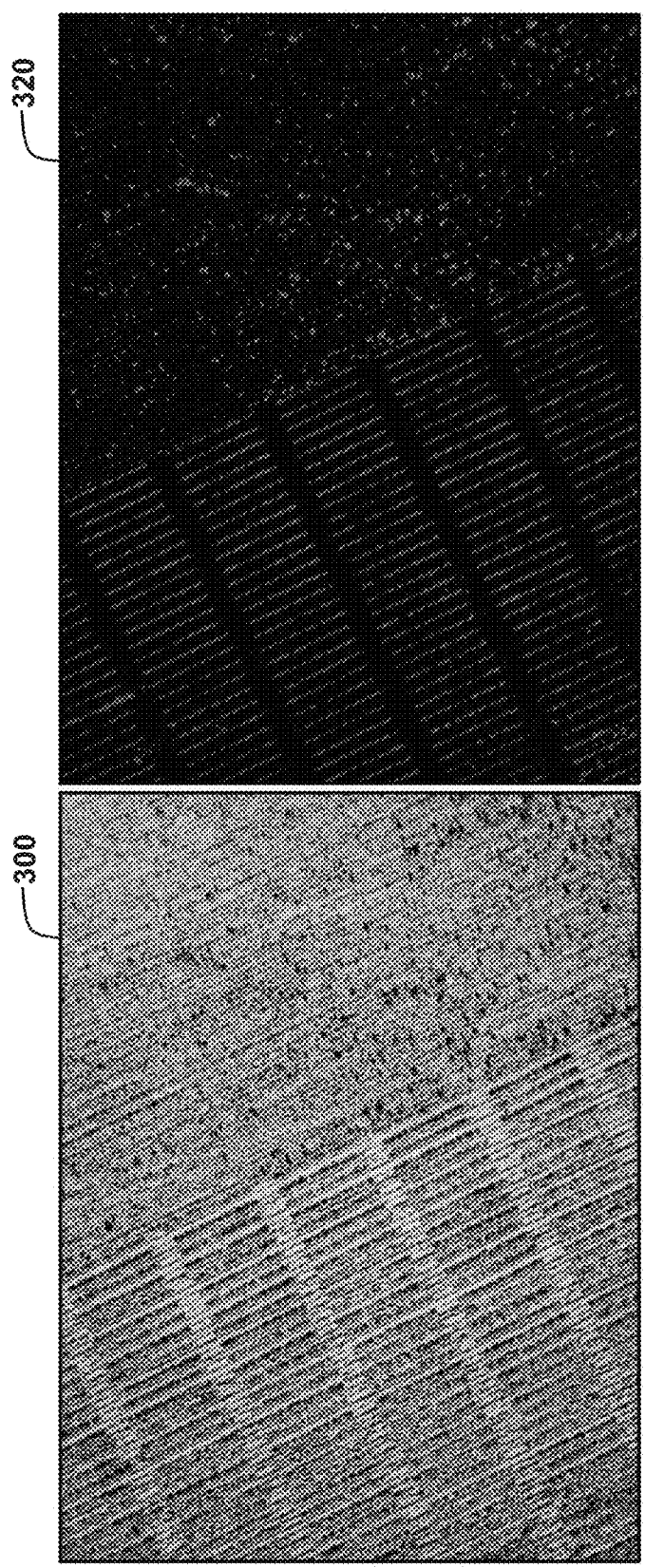
FIG. 5 shows an exemplary conversion of a raw input image into a single-band image.

In some embodiments, the processor 42 is configured to pre-process the plurality of raw input images prior to detecting the image space key points in the individual input images. Particularly, in some embodiments, the processor 42 is configured to convert each raw input image into a respective single-band image. As used herein, a "single-band" image refers to an image in which each pixel has/represents only a single intensity or brightness value. In at least one embodiment, the processor 42 is configured to convert each input image using parallelized computations. FIG. 5 shows an exemplary conversion of a raw input image 300 into a single-band image 320. In the illustrated embodiment, the processor 42 converts the raw input image 300 image into a greenness image 320 in which each pixel has an intensity or brightness corresponding to a greenness of the raw input image 300. However, other single-band or monochrome image formats can be used, such as grayscale in which each pixel has an intensity or brightness corresponding to some weighted combination of the RBG intensities in the raw input image 300. This conversion of the raw input images into single-band images is advantageous because it reduces the amount of information that needs to be processed by the processor 42 using the key point detection and description algorithm, thereby providing improved computational performance. Additionally, in some cases, this single-band conversion can provide improvements in accuracy of a key point matching process, described below.

Figure 6:
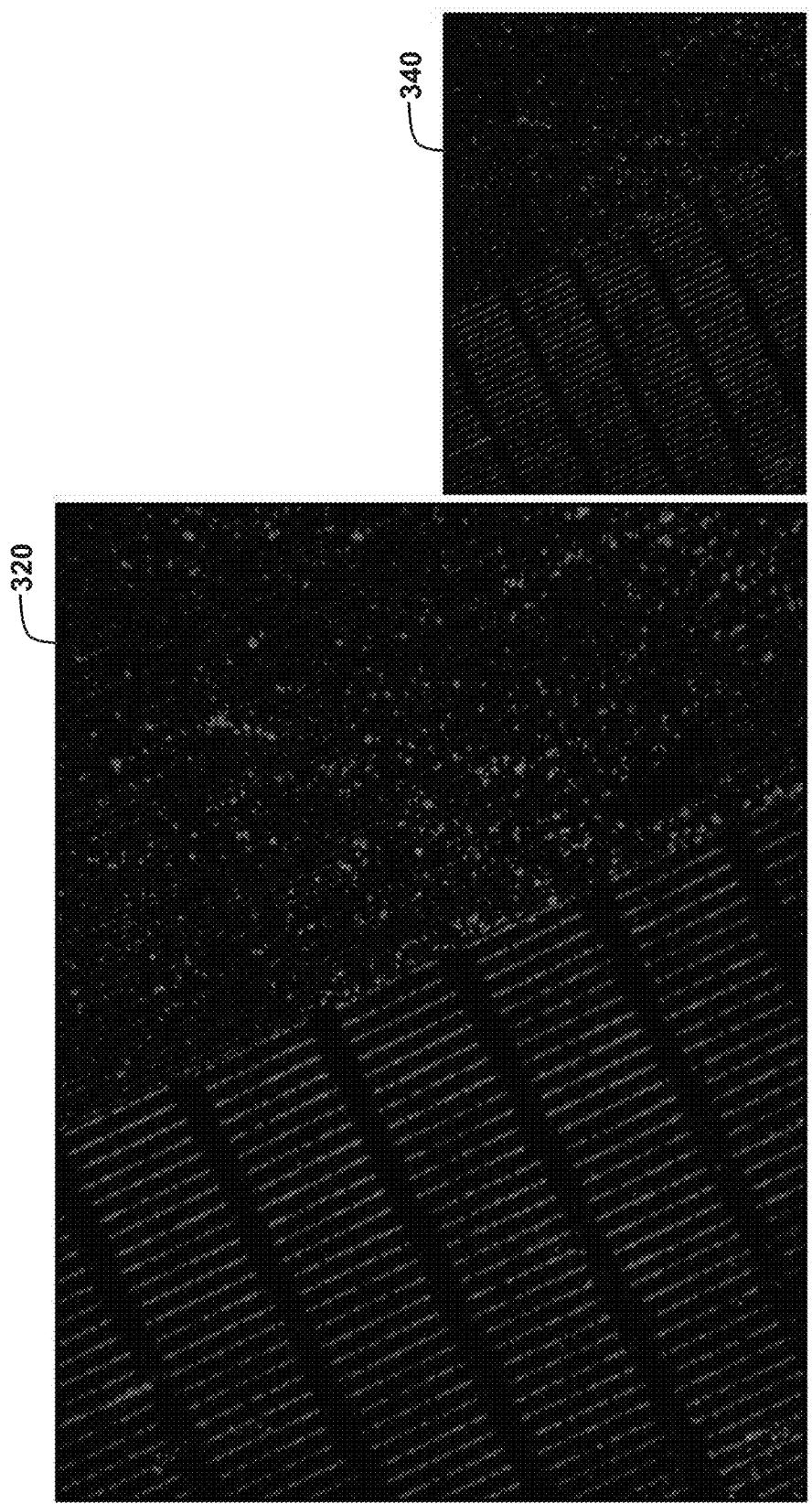
FIG. 6 shows an exemplary conversion of a single-band image into a downscaled single-band image.

In some embodiments, the processor 42 is configured to convert each input image into a downscaled image. In at least one embodiment, the processor 42 is configured to downscale each input image using parallelized computations. In at least one embodiment, this downscaling is performed in combination with the conversion into a single-band image to provide a downscaled single-band image. FIG. 6 shows an exemplary conversion of a single-band image into a downscaled single-band image. Particularly, in the illustrated embodiment, the processor 42 converts the greenness image 320 or other single-band image into a downscaled greenness image 340 or other downscaled single-band image. It will be appreciated that, in alternative embodiments, the processor 42 can be configured to first downscale the raw input image and then convert the downscaled raw image into a downscaled single-band image. This downscale conversion of the input images into downscaled images is advantageous because it further reduces the amount of information that needs to be processed by the processor 42 using the key point detection and description algorithm, thereby providing improved computational performance. Additionally, in some cases, this downscale conversion can provide improvements in accuracy of the key point matching process, described below.

Figure 7:
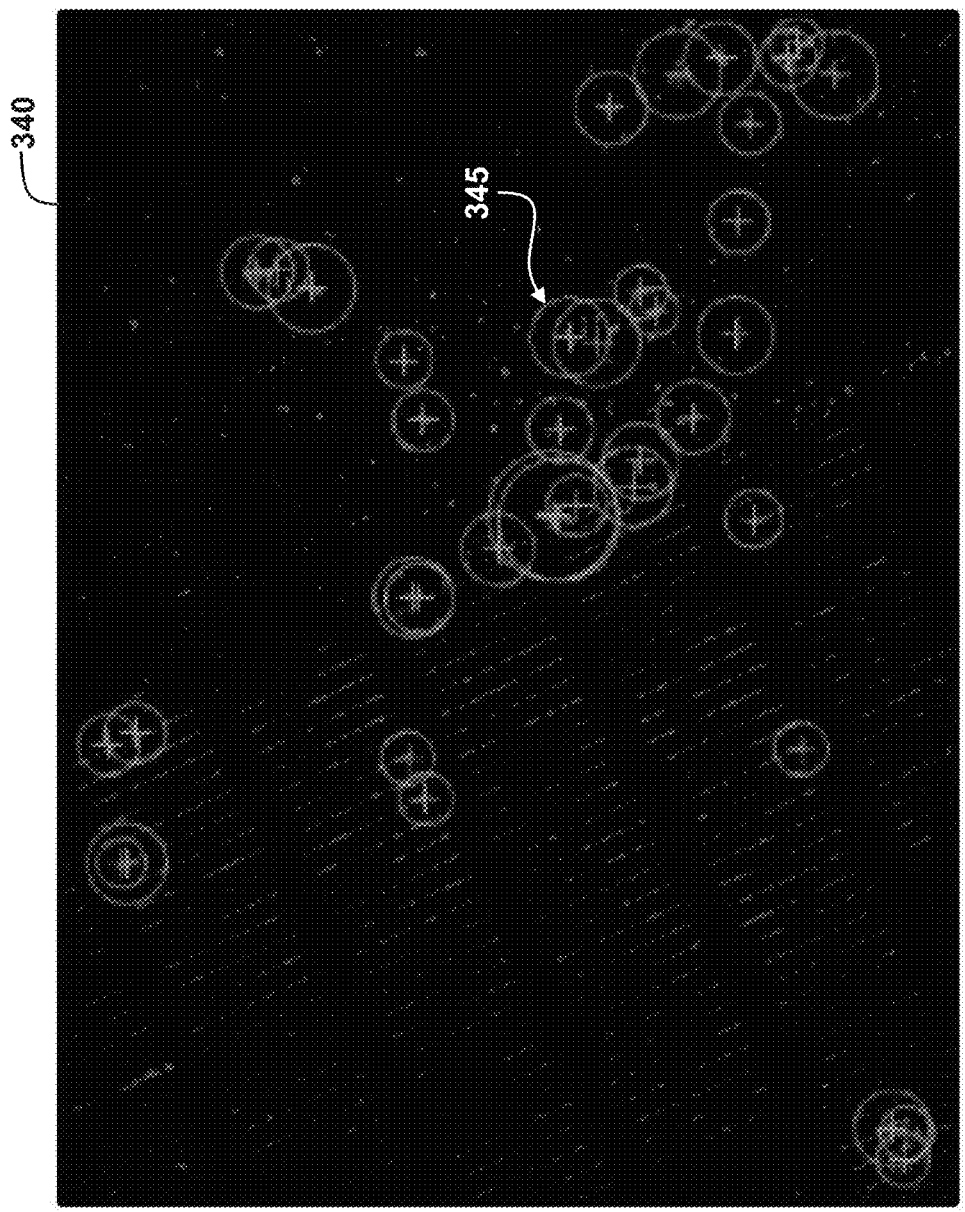
FIG. 7 shows an exemplary detection of key points in a downscaled single-band image.

After any pre-processing of the raw input images is complete, as mentioned above, the processor 42 is configured to detect one or more image space key points in each pre-processed input image (e.g., the downscaled single-band images) using a suitable key point detection and description algorithm, such as the Speeded-Up Robust Features (SURF) algorithm. In at least one embodiment, the processor 42 is configured to detect the key points in each pre-processed input image using parallelized computations. FIG. 7 shows an exemplary detection of key points in a downscaled single-band image. Particularly, in the illustration, key points 345 of the downscaled greenness image 340 are identified by an encircled plus sign. The relative size of each encircled plus sign may, for example, indicate a relative size or distinctiveness of the respective key point 345. As a result of the key point detection, the processor 42 determines a set of one or more key points for each input image, wherein each key point is defined by an image space coordinate and a descriptor.

Next, the processor 42 is configured to match or correlate the image space key points in each input image with key points in other input images. In at least one embodiment, the processor 42 matches or correlates the key points by comparing the descriptors of key points in each input image with descriptors of key points in other input images. In some embodiments, the processor 42 determines pairs of the input images that are expected to be overlapping based on the previously determined object space camera position coordinates $(x_{camera}, y_{camera}, z_{camera})^{initial}$ for each input image and compares the descriptors of key points in the overlapping pairs of input images to determine which key points can be matched or correlated. In at least one embodiment, the processor 42 is configured to match key points across different input images using parallelized computations. It should be appreciated that a particular key point may be matched or correlated across more than two input images, depending on the amount of overlap between the input images. Likewise, some key points may only appear in a single input image and are thus not matched at all.

Figure 8:
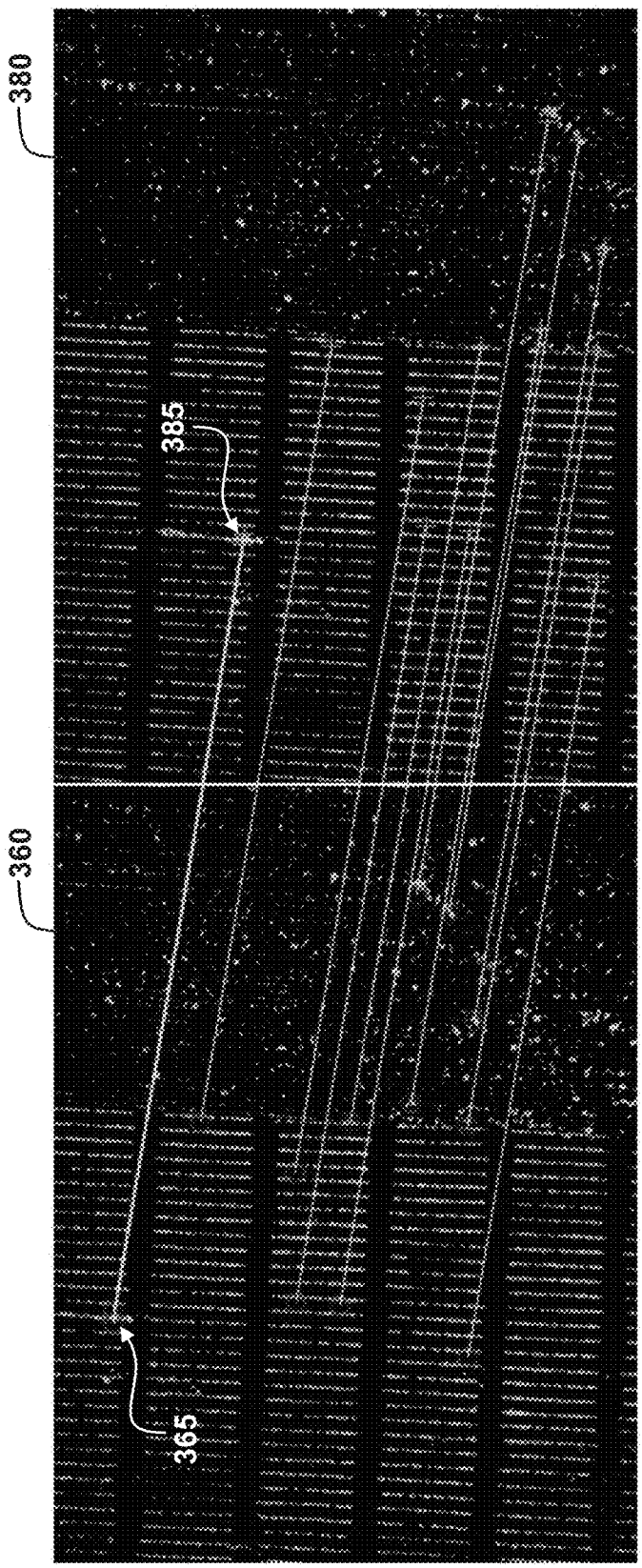
FIG. 8 shows an exemplary matching of key points between overlapping downscaled single-band images.

FIG. 8 shows an exemplary matching of image space key points between overlapping downscaled single-band images 360 and 380. Particularly, the first downscaled single-band image 360 corresponds to a first raw input image and the second downscaled single-band image 380 corresponds to a second raw input image that was captured by the drone 30 immediately before or after the first raw input image such that there is significant overlap between the downscaled single-band images 360 and 380. In the illustration, key points 365 of the first downscaled single-band image 360 are identified by circles and key points 385 of the second downscaled single-band image 380 are identified by plus signs. As a result of the key point matching or correlation process, the processor 42 determines a plurality of matched sets of identical key points, wherein each matched set of identical key points is defined by a common matched descriptor and a set of image space coordinates for the two or more different input images in which the identical key points appear.

Next, the processor 42 is configured to determine an object space coordinate for each matched set of identical key points, for example in the form of $(x_{keypoint}, y_{keypoint}, z_{keypoint})$. Particularly, for each respective identical key point, the processor 42 projects the respective image space coordinates of the two or more different input images in which the respective identical key point appears into the object space using a multiple-image forward projection. In at least one embodiment, the processor 42 is configured to perform the multiple-image forward projections using parallelized computations.

In at least one embodiment, for the purposes of the multiple-image forward projections, the processor 42 initializes the camera orientation $(\theta_{x_{camera}}, \theta_{y_{camera}}, \theta_{z_{camera}})$ for each input image with an initial value $(\theta_{x_{camera}}, \theta_{y_{camera}}, \theta_{z_{camera}})^{initial}$ corresponding to a perfectly nadir-view camera orientation. The processor 42 determines an initial value for the object space coordinates $(x_{keypoint}, y_{keypoint}, z_{keypoint})^{initial}$ for each respective identical key point by projecting the respective image space coordinates of the identical key points into the object space using a multiple-image forward projection using the initial camera position $(x_{camera}, y_{camera}, z_{camera})^{initial}$ and the initial camera orientation $(\theta_{x_{camera}}, \theta_{y_{camera}}, \theta_{z_{camera}})^{initial}$ for the respective input images in which the identical key points appear.

Figure 9:
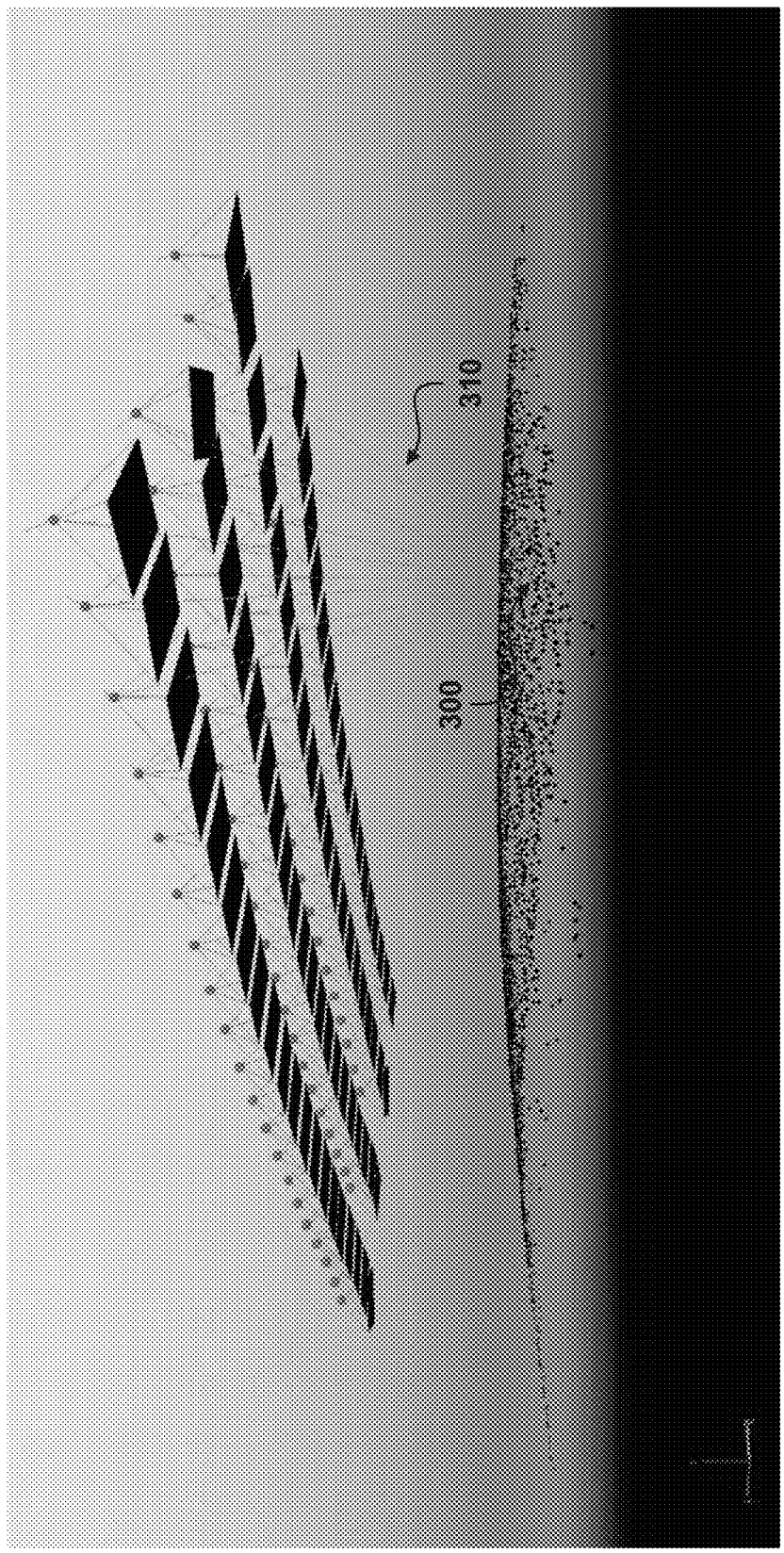
FIG. 9 shows an exemplary optimization for a key point that appears in multiple different input images.

Next, the processor 42 is configured to determine refined object space coordinates $(x_{keypoint}, y_{keypoint}, z_{keypoint})^{refined}$ for each set of identical key points and a refined camera position $(x_{camera}, y_{camera}, z_{camera})^{refined}$ and camera orientation $(\theta_{x_{camera}}, \theta_{y_{camera}}, \theta_{z_{camera}})^{refined}$ for each input image using a bundle adjustment procedure or equivalent optimization algorithm in which a reprojection error is minimized between the object space coordinates and the image space coordinates of the key points. In at least one embodiment, the processor 42 is configured to perform the bundle adjustment procedure or equivalent optimization algorithm using parallelized computations. FIG. 9 shows an exemplary optimization for a key point 300 that identically appears in multiple different input images. Projection vectors 310 extend from input images in which the key point 300 appears. The object space coordinate for the key point 300 is the point of intersection of the projection vectors 310 extending from the inputs images in which the key point 300 appears. Prior to optimization, the projection vectors 310 likely do not intersect at a common point of intersection due to reprojection errors. During optimization, the camera poses for the input images in which the key point 300 appears and the object space coordinate for the key point 300 are iteratively adjusted until the projection vectors 310 intersect at the object space coordinate for the key point 300.

Figure 10:
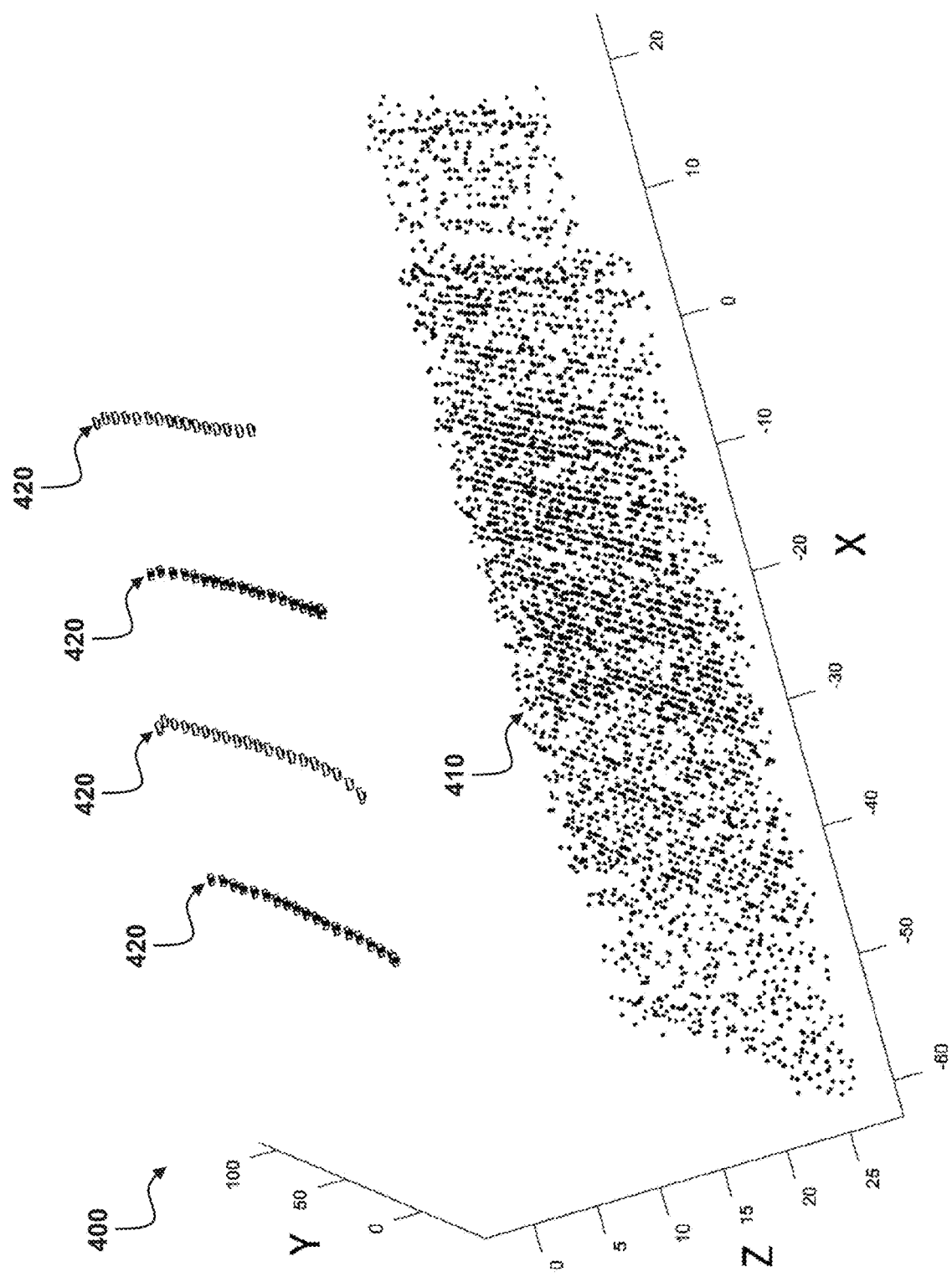
FIG. 10 shows a three-dimensional graph having an exemplary set of refined object space coordinates for the key points and an exemplary set of refined camera poses for the input images.

FIG. 10 shows a three-dimensional graph 400 having an exemplary set of refined object space coordinates for the key points and an exemplary set of refined camera poses for the input images. Particularly, the plot 400 includes a point cloud 410 representing refined object space coordinates $(x_{keypoint}, y_{keypoint}, z_{keypoint})^{refined}$ for the key points. Additionally, the graph 400 includes a plurality of camera icons 420 refined representing the camera position $(x_{camera}, y_{camera}, z_{camera})^{refined}$ and the camera orientation $(\theta_{x_{camera}}, \theta_{y_{camera}}, \theta_{z_{camera}})^{refined}$ for each input image that was captured by the drone 30. As can be seen, the points of the point cloud 410 are essentially coplanar because the agricultural field 10 is essentially flat.

Finally, in at least one embodiment, the processor 42 is configured to determine a fitted plane that best fits the refined object space coordinates $(x_{keypoint}, y_{keypoint}, z_{keypoint})^{refined}$ for the key points, and thus represents the essentially flat agricultural field 10. The fitted plane may, for example, be represented by the equation $Ax+By+Cz=D$. The processor 42 calculates values for the four parameters A, B, C, D that define the fitted plane that best fits the refined object space refined coordinates $(x_{keypoint}, y_{keypoint}, z_{keypoint})$ for the key points, for example using a least-squares fitting algorithm. In this way, the four parameters A, B, C, D that define the fitted plane can be used for future calculations, rather than all of the refined object space coordinates $(x_{keypoint}, y_{keypoint}, z_{keypoint})^{refined}$ for the key points, thereby providing computational performance improvements.

Returning to FIG. 3, the method 100 continues with a step of calculating object space center points for the research plots of the agricultural field based on a user-defined plot layout (block 150). Particularly, the processor 42 is configured to determine an object space coordinate for a center point of each research plot 12 in the agricultural field 10, for example in the form of ($x_{plot\_center}$, $y_{plot\_center}$, $z_{plot\_center}$). In at least some embodiments, the processor 42 calculates the plot center points ($x_{plot\_center}$, $y_{plot\_center}$, $z_{plot\_center}$) based on user-defined information stored in the plot layout configuration file 56. In at least some embodiments, the processor 42 calculates the plot center points ($x_{plot\_center}$, $y_{plot\_center}$, $z_{plot\_center}$) such that they lie on the fitted plane $Ax+By+Cz=D$.

Figure 11:
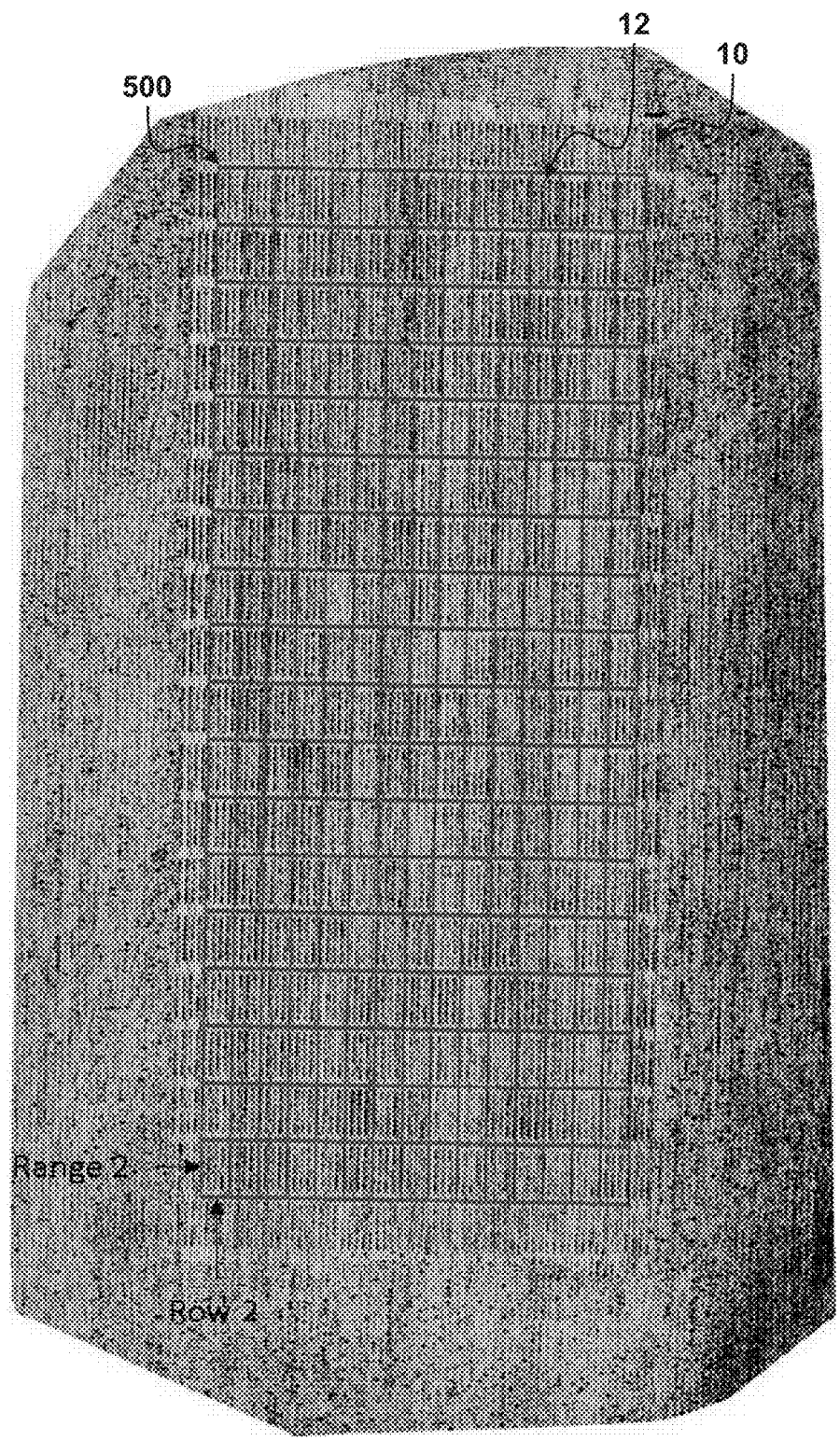
FIG. 11 shows an exemplary plot layout for research plots of the agricultural field.

The plot layout configuration file 56 at least stores GPS coordinates or equivalent coordinates for each of the four corners of the portion of the agricultural field 10 to be processed, a number rows of research plots 12 in the agricultural field 10 to be processed, and a number of ranges of research plots 12 in the agricultural field 10 to be processed. In addition, the plot layout configuration file 56 may further define starting row and range numbers (e.g., row 2, range 2), a number of planted crop rows per research plot (e.g., 4 crop rows), ID numbers for each crop row in each research plot (e.g., 1, 2, 3, 4), a vertical plot stagger (e.g., 0 feet), a vertical measurement buffer (e.g., 3 feet), and phenotypes to be measured (e.g., canopy cover and greenness). FIG. 11 shows an exemplary plot layout 500 for the research plots 12 of the agricultural field 10. In the illustrated embodiment, the agricultural field 10 includes seventeen rows and twenty ranges of research plots. However, the plot layout 500 excludes the outermost research plots of the agricultural field 10 and forms of a grid of fifteen rows and eighteen ranges of research plots 12 to be processed. Thus, as defined by the plot layout 500, rows two through sixteen and ranges two through nineteen are to be processed.

First, the processor 42 is configured to determine the plot center points ($x_{plot\_center}$, $y_{plot\_center}$, $z_{plot\_center}$) of each of the four corner research plots of the plot layout defined by the plot layout configuration file 56. The processor 42 converts the GPS coordinates or equivalent coordinates for each of the four corners of the portion of the agricultural field 10 to be processed into object space coordinates. Based on the object space coordinates for the four corners, the processor 42 determines an initial value for the plot center points ($x_{plot\_center}$, $y_{plot\_center}$, $z_{plot\_center}$)$^{initial}$ of each of the four corner research plots. In at least one embodiment, the processor 42 determines the initial) initial plot center points ($x_{plot\_center}$, $y_{plot\_center}$, $z_{plot\_center}$)$^{initial}$ of each of the four corner research plots such that they lie on the fitted plane $Ax+By+Cz=D$.

In at least one embodiment, the processor 42 is configured to update the initial) plot center points ($x_{plot\_center}$, $y_{plot\_center}$, $z_{plot\_center}$)$^{initial}$ of each of the four corner research plots based on user inputs that confirm the locations of each of the four corner research plots. Particularly, the GPS coordinates or equivalent coordinates defined in the plot layout configuration file 56 may not be perfectly accurate. Accordingly, it is advantageous to refine the initial values for the plot center points ($x_{plot\_center}$, $y_{plot\_center}$, $z_{plot\_center}$)$^{initial}$ of each of the four corner research plots by receiving user inputs that indicate a more precise location of each of the four corner research plots.

To this end, the processor 42 is configured to generate a plurality of orthorectified corner plot images by orthorectifying each of the raw input images that include the plot center points ($x_{plot\_center}$, $y_{plot\_center}$, $z_{plot\_center}$)$^{initial}$ of the four corner research plots. In order to determine which of the raw input images include the plot center points ($x_{plot\_center}$, $y_{plot\_center}$, $z_{plot\_center}$)$^{initial}$ of the four corner research plots, the processor 42 is configure to project the plot center points ($x_{plot\_center}$, $y_{plot\_center}$, $z_{plot\_center}$)$^{initial}$ of the four corner research plots into the image space of the raw input images. If one of the plot center points ($x_{plot\_center}$, $y_{plot\_center}$, $z_{plot\_center}$)$^{initial}$ of the four corner research plots appears within the bounds of a raw input image, then the processor 42 orthorectifies the respective raw input image to produce a respective orthorectified corner plot image. The processor 42 is configured to orthorectify the images such that the resulting orthorectified images appear to have been captured from a perfectly nadir-view camera orientation. The processor 42 is configured to perform this orthorectification based on the previously determined fitted plane $Ax+By+Cz=D$, the previously refined camera poses for the respective raw input images, and the initial values for the plot center points ($x_{plot\_center}$, $y_{plot\_center}$, $z_{plot\_center}$)$^{initial}$ of each of the four corner research plots. In at least one embodiment, the processor 42 is configured to perform these orthorectifications using parallelized computations.

Figure 12:
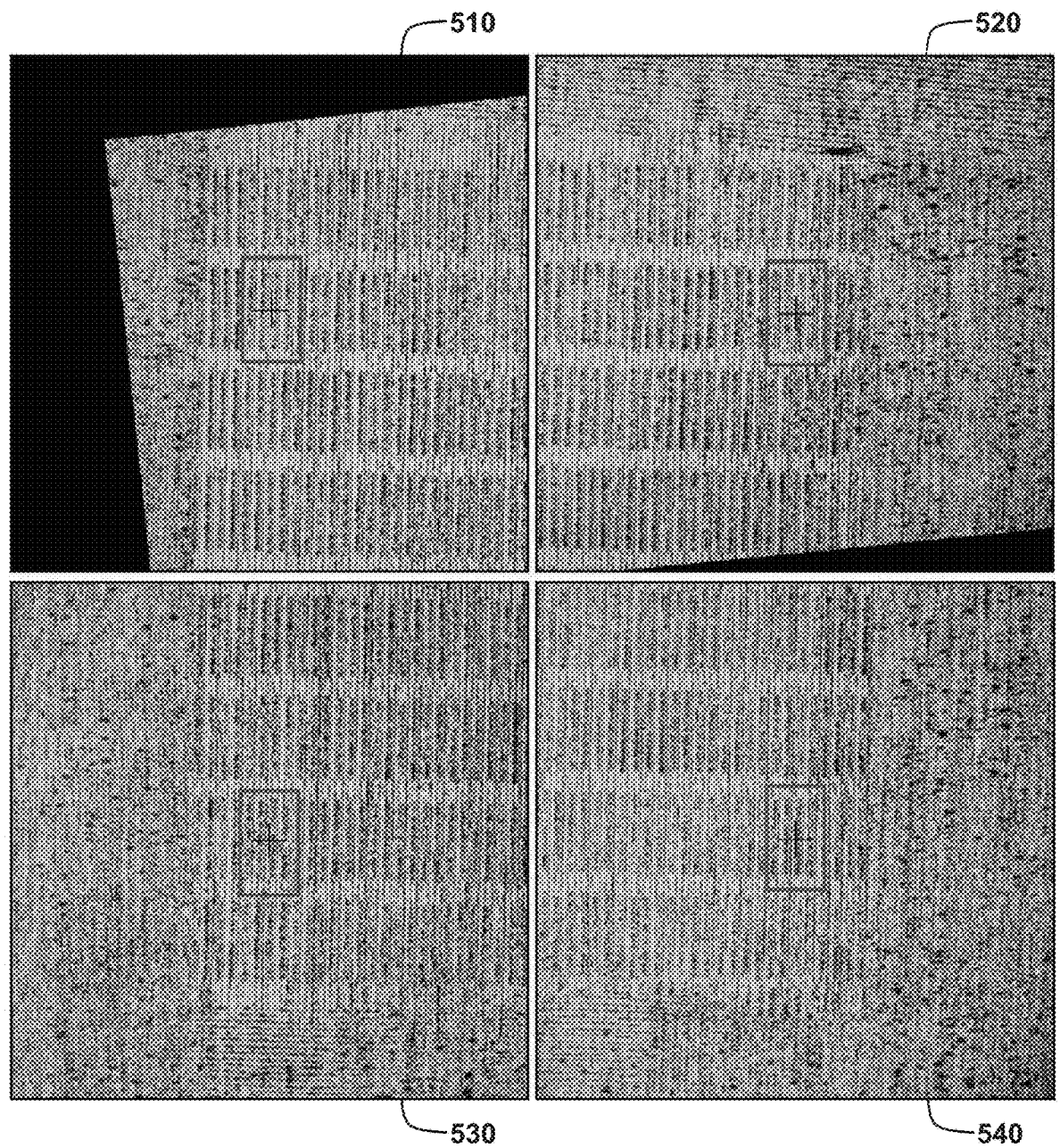
FIG. 12 shows representative orthorectified corner plots for the four corner research plots of the agricultural field.

Next, the processor 42 is configured to identify, for each of the four corner research plots, a respective representative orthorectified corner plot image in which the image space projection of the corresponding object space plot center point ($x_{plot\_center}$, $y_{plot\_center}$, $z_{plot\_center}$)$^{initial}$ is closest to a center of the orthorectified corner plot image. FIG. 12 shows representative orthorectified corner plot images for the four corner research plots of the agricultural field 10. Particularly, the representative orthorectified corner plot image 510 shows a top-left (lowest row number, highest range number) corner plot of the agricultural field 10. The representative orthorectified corner plot image 520 shows a top-right (highest row number, highest range number) corner plot of the agricultural field 10. The representative orthorectified corner plot image 530 shows a bottom-left (lowest row number, lowest range number) corner plot of the agricultural field 10. Finally, the representative orthorectified corner plot image 540 shows a bottom-right (highest row number, lowest range number) corner plot of the agricultural field 10.

The processor 42 is configured to operate the display screen 48 to display the representative orthorectified corner plot image for each of the four corner research plots of the agricultural field 10. The user provides user inputs via the user interface 50 or, in the case of a touch screen display, via the display screen 48, which indicate a refined position of the corner research plot in each of the four representative orthorectified corner plot images. For example, in one embodiment, the user may manipulate a cursor on the display screen 48 to select a point or area in the representative orthorectified corner plot image for each of the four corner research plots that he or she believes is the refined center point or area for the respective corner research plot. The processor 42 receives these user inputs and determines a user-defined plot center point in the image space of the representative orthorectified corner plot image for each of the four corner research plots. The processor 42 projects each of user-defined plot center points from their respective image spaces into the object space to arrive at refined plot center points ($x_{plot\_center}$, $y_{plot\_center}$, $z_{plot\_center}$)$^{updated}$ of each of the four corner research plots.

Once reined plot center points ($x_{plot\_center}$, $y_{plot\_center}$, $z_{plot\_center}$) of each of the four corner research plots are determined in the object space, the processor 42 is configured to determine plot center points ($x_{plot\_center}$, $y_{plot\_center}$, $z_{plot\_center}$) for each of the remaining non-corner research plots. Particularly, the processor 42 determines plot center points ($x_{plot\_center}$, $y_{plot\_center}$, $z_{plot\_center}$) for each of the remaining non-corner research plots as a grid that is bounded by the plot center points ($x_{plot\_center}$, $y_{plot\_center}$, $z_{plot\_center}$) of each of the four corner research plots and based on the number of ranges and number of rows, as defined in the plot layout configuration file 56. In at least one embodiment, the processor 42 determines the plot center points $(x_{plot\_center}, y_{plot\_center}, z_{plot\_center})^{initial}$ of the remaining non-corner research plots such that they lie on the fitted plane $Ax+By+Cz=D$.

Figure 13:
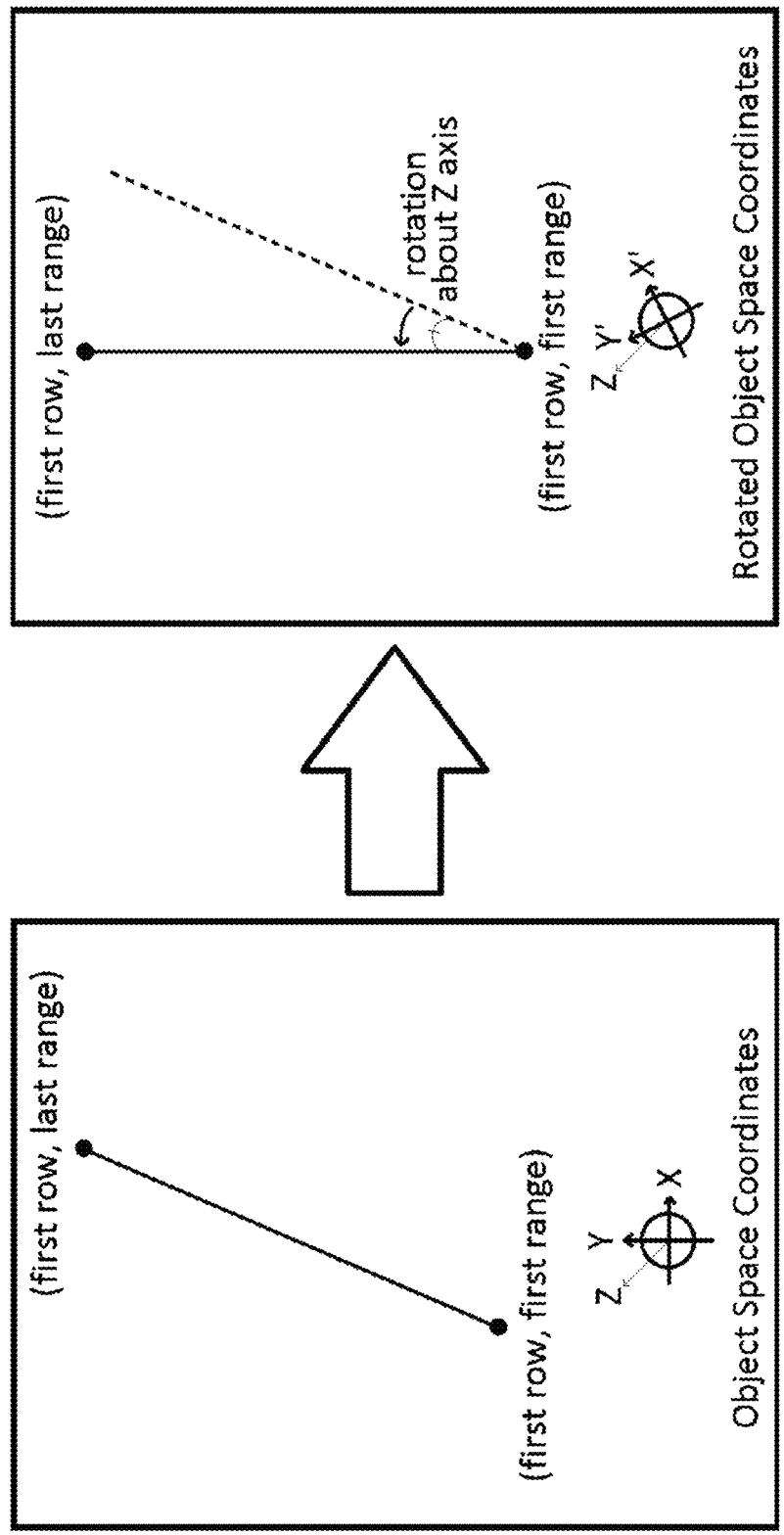
FIG. 13 shows a rotation of the object space reference frame to align with the true orientation of the agricultural field.
Figure 14:
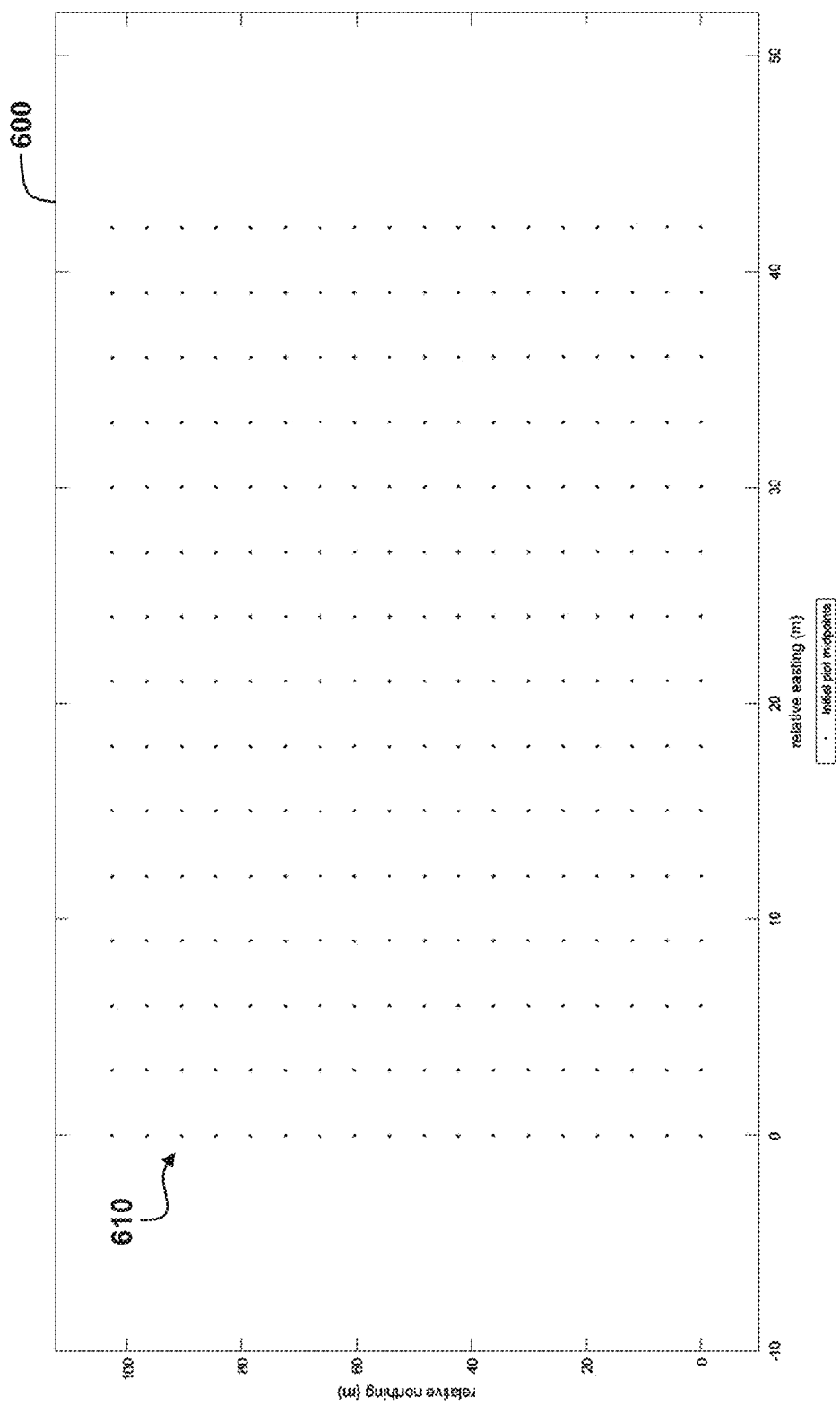
FIG. 14 shows a graph having an exemplary set of plot center points for all of the research plots of the agricultural field.

In at least one embodiment, the processor 42 is configured to transform, by rotation and/or translation, the plot center points $(x_{plot\_center}, y_{plot\_center}, z_{plot\_center})$ for all of the research plots 12 of the agricultural field 10, as well as the camera positions $(x_{camera}, y_{camera}, z_{camera})$ and the camera orientations $(\theta_{x_{camera}}, \theta_{y_{camera}}, \theta_{z_{camera}})$ for all of the input images, into a local/relative reference frame that corresponds to the true orientation of the planted rows of crops or other vegetation in the agricultural field 10. In some embodiments, the processor 42 is configured to also transform the fitted plane $Ax+By+Cz=D$. It is noted that the agricultural field 10 may be slightly rotated compared to true northings and true eastings. Accordingly, the processor 42 is configured to rotate the plot center points for all of the research plots 12, as well as the camera positions and the camera orientations for all of the input images, about the Z-axis, as shown in FIG. 13. Additionally, if the agricultural field 10 is on a slight slope, the processor 42 may perform additional rotations about the X and/or Y axes. FIG. 14 shows a plot 600 having an exemplary set of object space plot center points 610 for all of the research plots 12 of the agricultural field 10 in the local/relative reference frame that corresponds to the true orientation of the planted rows of crops or other vegetation in the agricultural field 10.

Figure 15:
FIG. 15 shows an exemplary output image of an individual rectangular research plot.

Returning to FIG. 3, the method 100 continues with a step of generating a plurality of output images of individual research plots, which are centered, cropped, and orthorectified (block 170). Particularly, the processor 42 is configured to generate a plurality of output images of individual research plots 12. Since each individual research plot 12 is captured in several of the overlapping raw input images, the processor 42 generates several different replicate output images of each particular research plot 12 of the agricultural field 10. In at least one embodiment, the processor 42 is configured to generate the plurality of output images using parallelized computations. FIG. 15 shows an exemplary output image 700 of an individual rectangular research plot having four vertical rows of soybeans. As can be seen, the exemplary output image 700 is orthorectified so as to appear to have been captured from a perfectly nadir-view camera orientation. Additionally, the exemplary output image 700 is rotated so as to be aligned with the local/relative reference frame that corresponds to the true orientation of the planted rows of crops or other vegetation in the agricultural field 10, such that the rectangular research plots are oriented straight up and down in the resulting orthorectified images. Finally, the output image is centered and cropped with respect to the rectangular research plot.

First, the processor 42 is configured to orthorectify each of the raw input images, thereby producing a plurality of orthorectified images. It should be appreciated that, at this stage in the method 100, the processor 42 has determined, in the object space, plot center points $(x_{plot\_center}, y_{plot\_center}, z_{plot\_center})$ for all of the research plots 12 of the agricultural field 10, camera positions $(x_{camera}, y_{camera}, z_{camera})$ for all of the input images, the camera orientations $(\theta_{x_{camera}}, \theta_{y_{camera}}, \theta_{z_{camera}})$ for all of the input images, and a fitted plane $Ax+By+Cz=D$ that represents the essentially flat agricultural field 10. Thus, the necessary information is available to separately orthorectify each of the plurality of raw input images such that each image appears to have been captured from a perfectly nadir-view camera orientation and such that the rectangular research plots therein are oriented straight up and down. In at least one embodiment, the processor 42 is configured to perform these orthorectifications using parallelized computations. It is noted that, in at least some embodiments, the raw input images containing the four corner research plots have already been orthorectified. Thus, in at least some embodiments, the processor 42 only orthorectifies the remaining raw input images having only non-corner research plots.

Next, the processor 42 is configured to determine which research plots 12 appear in which of the orthorectified images, and registers or otherwise associates the orthorectified images with the research plots 12 contained therein. More particularly, the processor 42 determines which of the orthorectified images include each plot center point $(x_{plot\_center}, y_{plot\_center}, z_{plot\_center})$ by projecting the plot center points $(x_{plot\_center}, y_{plot\_center}, z_{plot\_center})$ into the image space of each of the orthorectified images. If a particular plot center point $(x_{plot\_center}, y_{plot\_center}, z_{plot\_center})$, projected in the image space of a particular orthorectified image, appears within the bounds of the particular orthorectified image, then the processor 42 registers or associates the particular research plot 12 with the particular orthorectified image. Thus, the processor 42 determines, for each research plot 12, a set of orthorectified images that include the respective research plot 12.

Once orthorectified images have been generated and associated with the individual research plots 12 contained therein, the processor 42 is configured to generate the plurality of output images of individual research plots 12, which are centered, cropped, and orthorectified, based on the orthorectified images in which the individual research plots 12 appear and based on the respective plot center points. Since each individual research plot 12 is captured in several of the overlapping orthorectified images, the processor 42 generates several different replicate output images of each particular research plot 12 of the agricultural field 10. In at least one embodiment, the processor 42 is configured to generate the plurality of output images using parallelized computations.

In at least one embodiment, before generating the final set of output images of individual research plots 12, which are centered, cropped, and orthorectified, the processor 42 is configured to determine refined plot center point $(x_{plot\_center}, y_{plot\_center}, z_{plot\_center})^{refined}$ for each research plot based on a greenness center of the respective research plot 12 in the orthorectified images. In at least one embodiment, the processor 42 is configured to determine the refined plot center points using parallelized computations.

Figure 16:
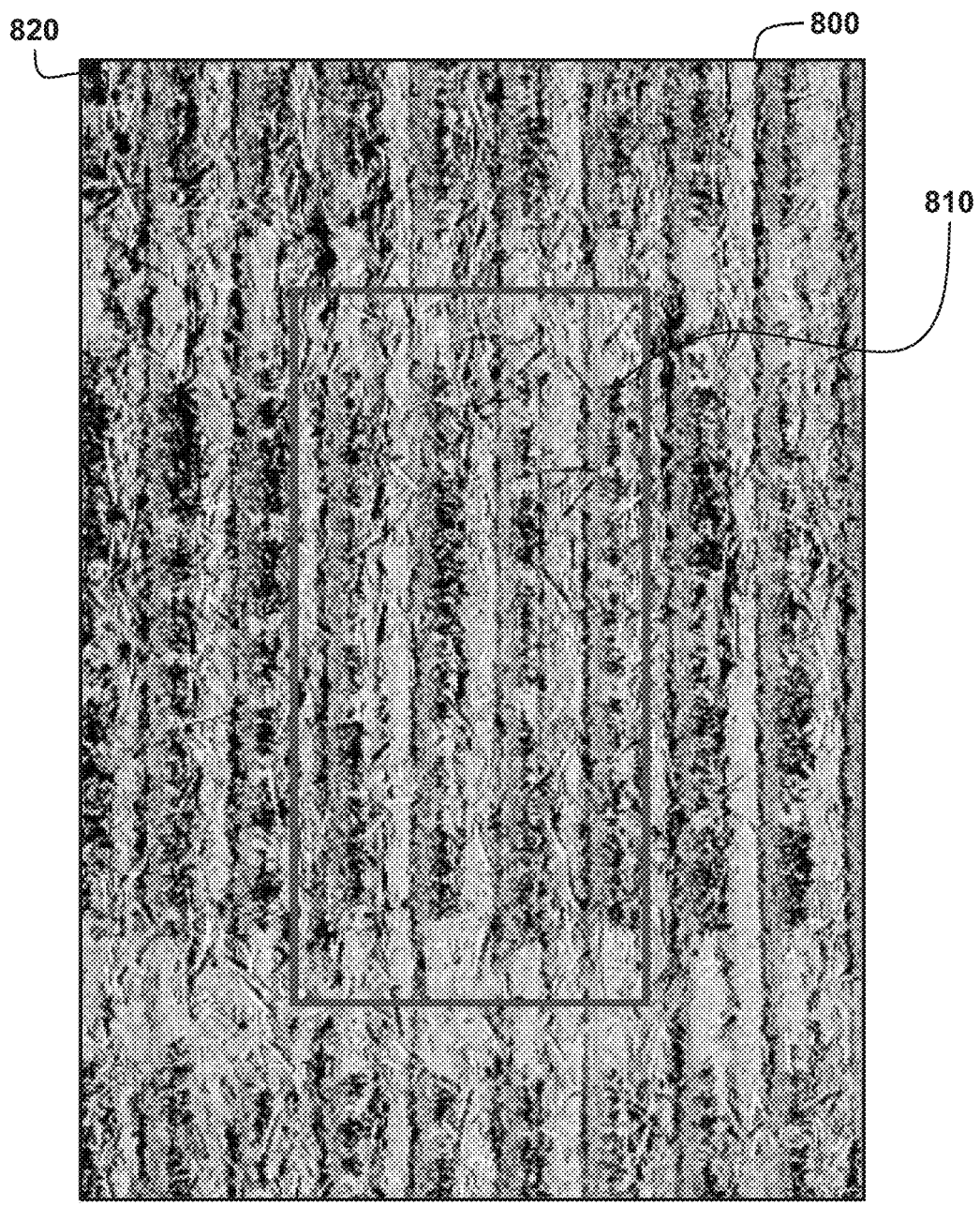
FIG. 16 shows an exemplary padded reference image of an individual rectangular research plot.

Particularly, for each research plot 12, the processor 42 generates a padded reference image based on one of the orthorectified images in which the respective research plot 12 appears. The padded reference image is similar the final output images, but is not cropped with respect to the research plot 12. Instead, the padded reference image includes the research plot centered in the image with a buffer region of predetermined size around the perimeter of the research plot 12 in the image. In at least one embodiment, the processor 42 is configured to identify the orthorectified image in which the image space projection of the object space plot center point $(x_{plot\_center}, y_{plot\_center}, z_{plot\_center})$ is closest to a center of the orthorectified image and generate the padded reference image based on that identified orthorectified image. FIG. 16 shows an exemplary padded reference image 800. The padded reference image 800 includes a central area 810 that includes a respective research plot and a padding area 820 that surrounds the central area. It should be appreciated that, if the previously determined plot center point is somewhat inaccurate, the padding area 820 enables the entirety of the research plot to still be captured in the padded reference image 800.

Once a padded reference image has been generated for each research plot 12, the processor 42 is configured to determine a greenness center of each padded reference image. Particularly, the processor 42 converts each padded reference image into a padded greenness image. In each case, based on the padded greenness image, the processor 42 determines a vertical greenness profile and horizontal greenness profile. The vertical greenness profile indicates a total or average greenness of each horizontal row of pixels in the padded greenness image. Peaks and troughs in the vertical greenness profile can be used identify where the crop rows of the target research plot exist in the padded reference image and where the gaps between the target research plot and adjacent research plots above and below exist in the padded reference image. Similarly, the horizontal greenness profile indicates a total or average greenness of each vertical row of pixels in the padded greenness image. Peaks and troughs in the horizontal greenness profile can be used to identify more precisely where the crop rows of the target research plot exist in the padded reference image and where the gaps between the individual crop rows exist in the padded reference image. Based on the locations of the peaks and troughs of the vertical and horizontal greenness profiles, the processor 42 determines a greenness center for the respective research plot 12. The processor 42 projects the determined greenness center into the object space to arrive at the refined plot center point $(x_{plot\_center}, y_{plot\_center}, z_{plot\_center})^{refined}$ for the respective research plot 12.

Figure 17:
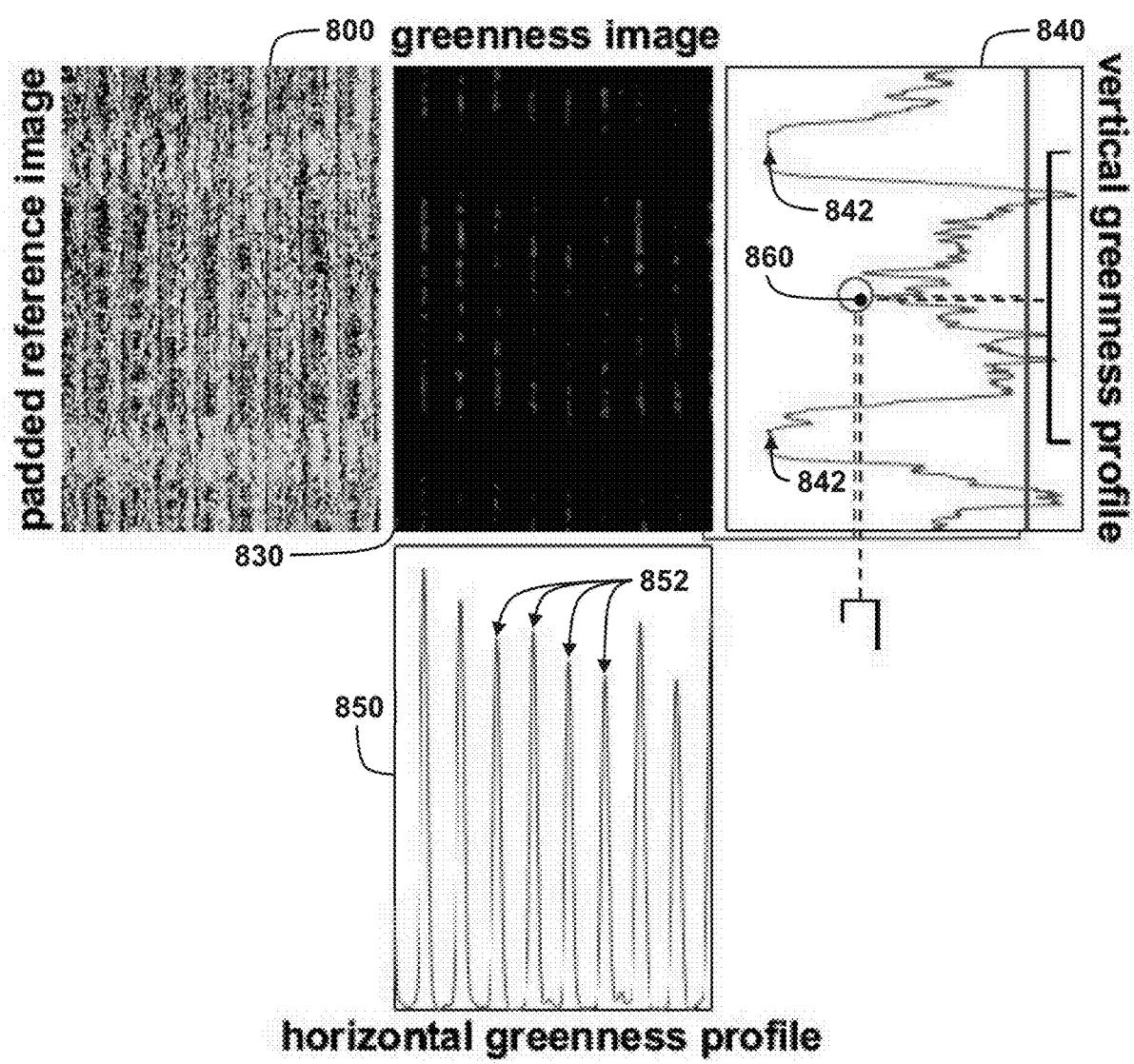
FIG. 17 shows a process for determining a greenness center of a padded reference image.

FIG. 17 shows a process for determining a greenness center of the padded reference image 800. Particularly, a padded greenness image 830 has been determined based on the padded reference image 800. Moreover, a vertical greenness profile 840 and a horizontal greenness profile 850 have been determined based on the padded greenness image 830. As can be seen, the vertical greenness profile 840 has troughs 842 corresponding to the gaps (without any vegetation) between the target research plot and adjacent research plots above and below. The vertical coordinate for the greenness center 860 of the respective research plot is determined as the halfway point between the troughs 842. Similarly, as can be seen, the horizontal greenness profile 850 has peaks 852 corresponding to the four crop rows of the target research plot. Since an even number of crop rows are included in the research plot, the horizontal coordinate for the greenness center 860 of the respective research plot is determined as the halfway point between the middle pair of peaks 852 or as an average horizontal value of the peaks 852. If an odd number of crop rows are included in the research plot, then the horizontal coordinate for the greenness center 860 of the respective research plot is determined as aligned with the middle peak or as an average horizontal value of the peaks.

Once refined plot center points $(x_{plot\_center}, y_{plot\_center}, z_{plot\_center})^{refined}$ are determined for the research plots 12 of the agricultural field 10, the processor 42 is configured to generate the plurality of output images of individual research plots 12, which are centered, cropped, and orthorectified, based on the orthorectified images in which the individual research plots 12 appear and based on the respective refined plot center points $(x_{plot\_center}, y_{plot\_center}, z_{plot\_center})^{refined}$. Particularly, the processor 42) projects the refined plot center point $(x_{plot\_center}, y_{plot\_center},$ $z_{plot\_center})^{refined}$ into each orthorectified images in which the individual research plot appears and generates the output images of the individual research plot 12 by cropping the orthorectified image around the projected center point.

Returning to FIG. 3, the method 100 continues with the step of determining one or more phenotypes for crops or other vegetation planted in each individual research plot (block 190). Particularly, as noted above, for each individual research plot 12, a set of replicate output images have been generated, which are centered, cropped, and orthorectified. The processor 42 is configured to process the sets of replicate output images for individual research plots 12 to determined one or more phenotypes for the crops or other vegetation planted in the individual research plots 12. The processor 42 is configured to determine the phenotypes using any suitable image processing algorithm designed to measure or evaluate a particular phenotype of the crops or other vegetation. It will be appreciated that the particular image processing algorithm may vary depending on the particular phenotype being measured and on the type of crop that was planted in an individual research plot 12.

As noted above, the measured phenotypes may include, for example, canopy cover, greenness, stand count, or row length. Canopy cover is defined as the fraction of a fixed ground area covered by the canopy. It is a useful phenotype because it is closely related to light interception and yield. In one embodiment, the processor 42 measures canopy cover as the fraction of canopy pixels in each plot image based on maximum-likelihood classification. Canopy color or greenness is also a useful indicator of crop status because it can be used to model crop stress, senescence, and maturity. In one embodiment, the processor 42 measures canopy color by determining by its spectral reflectance. In another embodiment, the processor 42 measures canopy color as the average hue of all canopy pixels in each plot image.

The method 100 provides much more accurate phenotype measurement because it minimizes row-offset errors, minimizes variations in canopy cover and color from replicate photos, and minimizes geometric and radiometric distortion. Moreover, because most of the processes of the method 100 are separately performed with respect to each input image or each research plot, the method 100 can utilize parallelized computations to greatly improve performance and processing speed. In this way, phenotype measurement results can be obtained quickly out in the field without expensive computing hardware and without an internet connection.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for processing images of an agricultural field, the agricultural field having a plurality of plots, the method comprising:

receiving, with at least one processor, a plurality of input images that capture respective portions of the agricultural field in an overlapping manner, each input image in the plurality of images being captured by a camera positioned above the agricultural field and having metadata including a respective position of the camera at a time the respective input image was captured;

calculating, with the at least one processor, (i) object space positions in an object space of a plurality of key points in the plurality of images and (ii) an object space camera pose in the object space for each input image in the plurality of input images, the object space representing a real-world space of the agricultural field;

calculating, with the at least one processor, an object space center point in the object space for each plot in the plurality of plots based on a layout of the plurality of plots in the agricultural field; and generating, with the at least one processor, a plurality of output images, each output image in the plurality of output images being orthorectified and cropped with respect to a respective plot in plurality of plots based on an input image in the plurality of input images that includes the respective plot;

wherein generating the plurality of output images further comprises, generating, with the at least one processor, a plurality of orthorectified images by orthorectifying each respective input image of the plurality of output images based on the object space camera pose for the respective input image, and generating, with the at least one processor, the plurality of output images by, for each plot in the plurality of plots, cropping each orthorectified image in the plurality of orthorectified images that includes the respective plot based on the object space center point for the respective plot; and wherein the method further comprises, prior to generating the plurality of output images, generating, with the at least one processor, for each plot in the plurality of plots, a respective padded reference image by cropping an orthorectified image in the plurality of orthorectified images that includes the respective plot, the respective padded reference including the respective plot and a buffer region around a perimeter of the respective plot, and updating, with the at least one processor, for each plot in the plurality of plots, the object space center point for the respective plot based on a greenness profile of the respective padded reference image.

2. The method according to claim 1 further comprising:
determine, with the at least one processor, at least one phenotype of vegetation planted in each respective plot in plurality of plots based on the plurality of output images.

3. The method according to claim 1, the calculating the object space positions of the plurality of key points and the object space camera poses for the plurality of input images further comprising:
detecting, with the at least one processor, the plurality of key points in a respective image space of each respective input image in the plurality of input images;
identifying, with the at least one processor, sets of identical key points of the plurality of key points in respective sets overlapping input images in the plurality of input images; and
calculating, with the at least one processor, the object space positions of each set of identical key points by projecting the respective set of identical key points from the respective image spaces of the respective set of overlapping input images into the object space.

4. The method according to claim 3, the calculating the object space positions of the plurality of key points and the object space camera poses for the plurality of input images further comprising, prior to detecting the plurality of key points:

converting, with the at least one processor, the plurality of input images into a plurality of single-band input images.

5. The method according to claim 4, wherein the plurality of single-band input images is one of (i) a plurality of grayscale images and (ii) a plurality of greenness images.

6. The method according to claim 3, the calculating the object space positions of the plurality of key points and the object space camera poses for the plurality of input images further comprising, prior to detecting the plurality of key points:
downscaling, with the at least one processor, the plurality of input images into a plurality of downscaled input images.

7. The method according to claim 3, the calculating the object space positions of the plurality of key points and the object space camera poses for the plurality of input images further comprising:
calculating, with the at least one processor, the object space camera pose for each input image in the plurality of input images based on the respective position of the camera at the time the respective input image was captured; and
calculating, with the at least one processor, the object space positions of each set of identical key points based on the object space camera poses of the respective set of overlapping input images.

8. The method according to claim 7, the calculating the object space positions of the plurality of key points and the object space camera poses for the plurality of input images further comprising:
refining, with the at least one processor, values of the object space positions of the plurality of key points and values of the object space camera poses for the plurality of input images using a bundle adjustment procedure that minimizes reprojection error.

9. The method according to claim 1, the calculating the object space center points for the plurality of plots further comprising:
determining, with the at least one processor, a plane that best fits the object space positions of the plurality of key points; and
calculating, with the at least one processor, the object space center point for each plot in the plurality of plots in the object space such that the respective object space center point lies on the plane.

10. The method according to claim 1, the calculating the object space center points for the plurality of plots further comprising:
receiving, with the at least one processor, a position of each corner of the layout of the plurality of plots in the agricultural field; and
calculating, with the at least one processor, the object space center point for each plot in the plurality of plots based on the position of each corner of the layout of the plurality of plots in the agricultural field.

11. The method according to claim 10, the calculating the object space center points for the plurality of plots further comprising:
calculating, with the at least one processor, the object space center point for each plot in the plurality of plots that is arranged at one of the corners of the layout of the plurality of plots in the agricultural field;
updating, with the at least one processor, the object space center point for each plot that is arranged at one of the corners based on user inputs; and calculating, with the at least one processor, the object space center point for each plot in the plurality of plots that is not arranged at one of the corners of the layout of the plurality of plots in the agricultural field, based on the updated object space center point for each plot that is arranged at one of the corners.

12. The method according to claim 11, the updating the object space center point for each plot in the plurality of plots that is arranged at one of the corners further comprising:
displaying, on a display device, for each plot in the plurality of plots that is arranged at one of the corners, a respective input image of the plurality of input images that includes the respective plot;
receiving, with a user interface, for each plot in the plurality of plots that is arranged at one of the corners, a user input of the user inputs that indicates a respective position in a respective image space of the respective input image the respective plot is located; and
updating, with the at least one processor, for each plot in the plurality of plots that is arranged at one of the corners, the object space center point for the respective plot based on a projection of the respective position in the respective image space of the respective input image into the object space.

13. The method according to claim 12, the updating the object space center point for each plot that is arranged at one of the corners further comprising:
orthorectifying, with the at least one processor, for each plot that in the plurality of plots is arranged at one of the corners, the respective input image that includes the respective plot prior to displaying respective input image.

14. The method according to claim 1 further comprising:
receiving, with the at least one processor, a position of each corner of the layout of the plurality of plots in the agricultural field; and
transforming, with the at least one processor, the object space center points for the plurality of plots and the object space camera poses for the plurality of input images into a rotated reference frame that aligns with the layout of the plurality of plots in the agricultural field.

15. The method according to claim 1, the updating object space center point for each plot in the plurality of plots further comprising:
converting, with the at least one processor, for each plot in the plurality of plots, the respective padded reference image into a respective greenness image;
determining, with the at least one processor, for each plot in the plurality of plots, a greenness center point of the respective plot in the respective greenness image; and
updating, with the at least one processor, for each plot in the plurality of plots, the object space center point for the respective plot based on the greenness center point of the respective plot in the respective greenness image.

16. The method according to claim 15, the determining the greenness center point of the respective plot in the respective greenness image for each plot in the plurality of plots further comprising:
determining, with the at least one processor, for each plot in the plurality of plots, a respective horizontal greenness profile and a respective vertical greenness profile of the respective greenness image; and
determining, with the at least one processor, for each plot in the plurality of plots, the greenness center point of the respective plot based on peaks and troughs in the respective horizontal greenness profile and in the respective vertical greenness profile.

17. A processing system for processing images of an agricultural field, the agricultural field having a plurality of plots, the processing system comprising:
at least one memory configured to store program instructions and to store a plurality of input images that capture respective portions of the agricultural field in an overlapping manner, each input image in the plurality of images being captured by a camera positioned above the agricultural field and having metadata including a respective position of the camera at a time the respective input image was captured; and
at least one processor configured to execute the program instructions stored on the memory to:
calculate (i) object space positions in an object space of a plurality of key points in the plurality of images and (ii) an object space camera pose in the object space for each input image in the plurality of input images, the object space representing a real-world space of the agricultural field;
calculate an object space center point in the object space for each plot in the plurality of plots based on a layout of the plurality of plots in the agricultural field; and
generate a plurality of output images, each output image in the plurality of output images being orthorectified and cropped with respect to a respective plot in plurality of plots based on an input image in the plurality of input images that includes the respective plot;
wherein the at least one processor is further configured to generate the plurality of output images by,
generating, with the at least one processor, a plurality of orthorectified images by orthorectifying each respective input image of the plurality of output images based on the object space camera pose for the respective input image, and
generating, with the at least one processor, the plurality of output images by, for each plot in the plurality of plots, cropping each orthorectified image in the plurality of orthorectified images that includes the respective plot based on the object space center point for the respective plot; and
wherein the at least one processor is further configured to,
prior to generating the plurality of output images, generate, with the at least one processor, for each plot in the plurality of plots, a respective padded reference image by cropping an orthorectified image in the plurality of orthorectified images that includes the respective plot, the respective padded reference including the respective plot and a buffer region around a perimeter of the respective plot, and
update, with the at least one processor, for each plot in the plurality of plots, the object space center point for the respective plot based on a greenness profile of the respective padded reference image.

18. A non-transitory computer-readable medium for processing images of an agricultural field, the agricultural field having a plurality of plots, the computer-readable medium storing program instructions that, when executed by at least one processor, cause the at least one processor to perform a method comprising:
receiving a plurality of input images that capture respective portions of the agricultural field in an overlapping manner, each input image in the plurality of images being captured by a camera positioned above the agricultural field and having metadata including a respective position of the camera at a time the respective input image was captured;

calculating (i) object space positions in an object space of a plurality of key points in the plurality of images and (ii) an object space camera pose in the object space for each input image in the plurality of input images, the object space representing a real-world space of the agricultural field;

calculating an object space center point in the object space for each plot in the plurality of plots based on a layout of the plurality of plots in the agricultural field; and generate a plurality of output images, each output image in the plurality of output images being orthorectified and cropped with respect to a respective plot in plurality of plots based on an input image in the plurality of input images that includes the respective plot;

wherein generating the plurality of output images further comprises, generating, with the at least one processor, a plurality of orthorectified images by orthorectifying each respective input image of the plurality of output images based on the object space camera pose for the respective input image, and generating, with the at least one processor, the plurality of output images by, for each plot in the plurality of plots, cropping each orthorectified image in the plurality of orthorectified images that includes the respective plot based on the object space center point for the respective plot; and wherein the method further comprises, prior to generating the plurality of output images, generating, with the at least one processor, for each plot in the plurality of plots, a respective padded reference image by cropping an orthorectified image in the plurality of orthorectified images that includes the respective plot, the respective padded reference including the respective plot and a buffer region around a perimeter of the respective plot, and updating, with the at least one processor, for each plot in the plurality of plots, the object space center point for the respective plot based on a greenness profile of the respective padded reference image.

\* \* \* \* \*